US012671125B1

(12) United States Patent
Schink et al.

(10) Patent No.: US 12,671,125 B1
(45) Date of Patent: Jun. 30, 2026

(54) BATTERY CELL THERMAL REGULATION SYSTEM

(71) Applicant: Zoox, Inc., Foster City, CA (US)

(72) Inventors: Michael Franz Schink, San Francisco, CA (US); Vamsi Krishna Pathipati, San Carlos, CA (US)

(73) Assignee: Zoox, Inc., Foster City, CA (US)

( * ) Notice: Subject to any disclaimer, the term of this patent is extended or adjusted under 35 U.S.C. 154(b) by 974 days.

(21) Appl. No.: 17/890,052

(22) Filed: Aug. 17, 2022

(51) Int. Cl.
*H01M 10/653* (2014.01)
*H01M 10/6554* (2014.01)
*H01M 10/658* (2014.01)

(52) U.S. Cl.
CPC ..... *H01M 10/653* (2015.04); *H01M 10/6554* (2015.04); *H01M 10/658* (2015.04)

(58) Field of Classification Search
CPC ........... H01M 10/653; H01M 10/6554; H01M 10/658
See application file for complete search history.

(56) References Cited

U.S. PATENT DOCUMENTS

2020/0161600 A1* 5/2020 Abe .................... H01M 50/126

FOREIGN PATENT DOCUMENTS

DE 102020115897 A1 * 12/2021 .......... H01M 10/653

* cited by examiner

*Primary Examiner* — Jimmy Vo
(74) *Attorney, Agent, or Firm* — Lee & Hayes, P.C.

(57) ABSTRACT

A thermal normalization system for battery cells is described. The thermal normalization system normalizes temperatures across battery cells to reduce temperature gradients and hot zones within battery cells to improve performance and lifespan. The thermal normalization system includes parallel heat transfer paths for heat from cells, including a first path through an end of the cells in contact with a cooling element, such as a cold plate, and a second path through a heat bridge that couples a portion of the cell remote from the cooling element to the cooling element along a path thermally isolated from the first end of the cells.

9 Claims, 11 Drawing Sheets

600

BATTERY CELL THERMAL REGULATION SYSTEM

BACKGROUND

Electric vehicles can use battery systems to power the functions of the vehicles. Battery cells may generate waste heat during charge and discharge. Removal of waste heat from the battery cell can increase battery cell performance and prolong the useable life of the battery cell. Each battery cell may have an individual heat generation profile based on the thermal characteristics of the battery cell. Additionally, battery cells may be arranged into a bank and the heat generation profile of the bank may depend on the individual profiles of the cells. Due to the intrinsic properties of lithium-based electrode materials, the operating temperature is known to have a significant impact on lithium-ion batteries in terms of safety, degradation, and performance.

BRIEF DESCRIPTION OF THE DRAWINGS

The detailed description is described with reference to the accompanying FIGURES. In the FIGURES, the left-most digit of a reference number identifies the FIGURE in which the reference number first appears. The same reference numbers in different FIGURES indicate similar or identical items.

DETAILED DESCRIPTION

Figure 1:
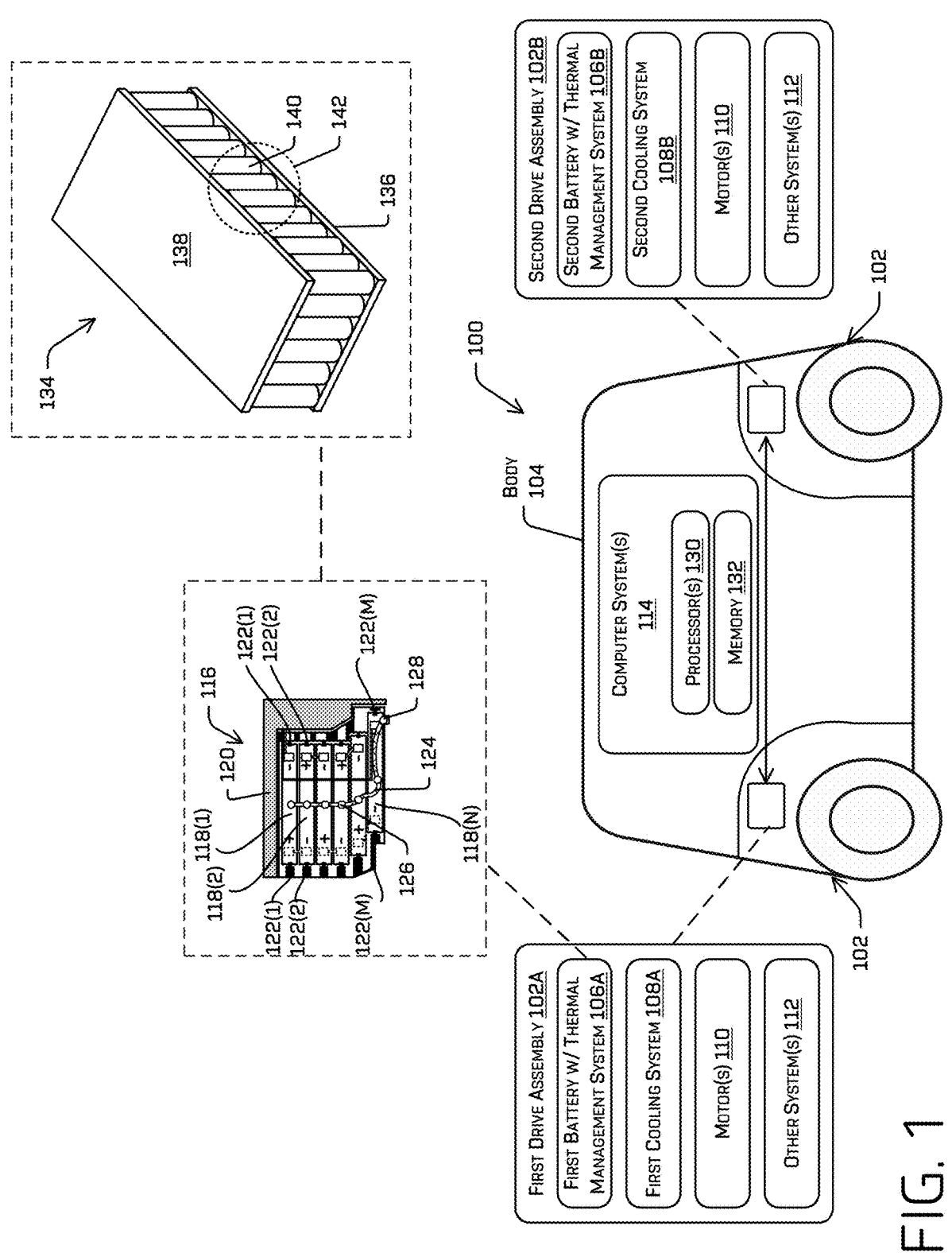
FIG. 1 is an illustration of an example autonomous vehicle having one or more batteries configured with thermal equalization systems to provide power to operating systems of the autonomous vehicle, according to at least one example.

This disclosure relates to thermal management and thermal normalization of battery cells to improve battery performance and extend battery cell life. Battery cells in a rechargeable array may be discharged and recharged multiple times. Accordingly, components of the battery cell and associated systems can be configured to support repeated charge and discharge cycling. For example, electric vehicle batteries can be configured for repeated charge and discharge over the course of the life of the battery. Such cycling may degrade the battery over its lifetime. At the end of a battery's lifespan, it may require replacement or significant refurbishment. One reason for degradation of a battery over time is the generation of waste heat within the individual cells of the battery. Another reason for degradation, and decreased performance of a battery is inconsistent temperatures across the battery, for example with hot spots and cold spots scattered throughout the battery. Such uneven temperature distribution negatively impacts performance and lifespan of the battery. Without adequate temperature control, the power and performance of a battery as well as the overall lifespan may be reduced, thereby increasing ownership cost of an electric vehicle or other battery powered devices and systems. Differences in the heat generation profile across cells in an array and across the array itself may complicate determination of optimal heat removal features. Furthermore, uneven temperature within battery cells, for example due to heat transfer to a single cooling element, can impact performance and lifespan of battery cells. The optimum operating temperature for a battery is suggested to be strictly controlled within a narrow range and normalized or equalized over the battery cells. It has been found that an extremely low temperature tends to increase the internal resistance and lead to capacity deficiencies, while an extremely high temperature may accelerate the electrode degradation and capacity reduction, or even lead to safety issues such as fire and explosion. In the examples described herein, portions of a battery cell distant from a cooling element are normalized to be closer in temperature to portions of the battery cell adjacent the cooling element. In some examples, such as with battery cells cooled from a cooling plate at one end of the battery cells, the cells exhibit higher temperatures away from the cooling element and significantly lower temperatures adjacent the cooling element. The temperature normalization described herein enables the portions of the battery cell away from the cooling element to be normalized and be closer to and/or within a threshold temperature of the portions adjacent the cooling element.

Differences in temperature within a battery cell can be due to various factors. For example, the location of a cell within an array, the age of a battery cell, the electrical loading on a cell, the existence of a heat removal system in thermal communication with the battery cell, and the relative location of a particular cell with respect to other cells in thermal communication with that heat removal system, etc. can contribute to temperature profile variability. Over the life of the battery, these differences can magnify, resulting in uneven temperature distribution through battery cells that results in decreased lifespan and performance for the battery cells, especially as the battery repeatedly cycles through the charged and discharged states. In some cooling systems, battery cells are cooled using a cooling element as part of a cooling system that may only be in contact with one end of the battery cell, and therefore can produce a temperature gradient across the battery cell where portions of the battery cell proximate the cooling element are significantly lower in temperature than portions distal from the cooling element.

The systems described herein provide for increasing the lifespan, thermal efficiency, and electrical productivity of an array of battery cells using one or more cell components that can be configured to normalize temperature distributions and gradients across the battery cells of an array. For example, it may be possible to prolong the life of one or more cells in an array by conducting heat from one or more of the electrodes of the cell using multiple parallel heat transfer paths from the battery cell to a cooling element located proximate the cells. In some examples, the systems provide temperature normalization across battery cells that may also include heat transfer into battery cells (e.g., heating battery cells) and providing temperature normalization across the cells, even though the cells may be heated and cooled from a single end of the cells.

In an illustrative example, a battery cell may be positioned within an array and have a first end adjacent a cooling element, such as a cooling plate or other thermal regulation component for transferring heat from the battery cells to a remote location for discharge. In this configuration, the battery cell can transfer heat through the first end to the cooling element, but such heat transfer alone may result in uneven temperature across the cell as the remote portions of the cell from the cooling element remain at high temperature while the portions of the cell proximate to the cooling element can be cooled. For heat to transfer from the distal end to the cooling element, the heat passes through the proximal end first and can result in temperature gradients from the proximal end to the distal end. Such temperature gradients can result in undesirable performance, thermal runaway, decreased capacity, and decreased lifespan for the cell. In an illustrative example, an additional heat transfer path is introduced that provides a thermal transfer bridge from the remote or distal portions of the battery cell to the cooling element that bypasses the portions of the cell proximate the cooling element. In this manner, the cell may transfer heat from both ends and/or across the entire length of the cell to the cooling element and thereby normalize the temperature within the cell during charging and/or discharging. The thermal transfer bridge can provide higher thermal conductivity, through the bridge, from the distal end to the cooling element than from the proximal end to the cooling element.

In the illustrative example, the additional heat transfer path includes a thermally conductive material in contact with the distal portion of the battery cell, isolated from the proximal portion of the cell, and thermally coupled with the cooling element. The heat transfer path, in the illustrative example, may include a pyrolytic graphite sheet or other thermal conductor that is relatively thin, so as to minimize impact on spacing between battery cells (e.g., without requiring additional spacing between battery cells). In some examples, the pyrolytic graphite sheet or other thermal conductor may also serve to isolate the cells of the battery from each other. The pyrolytic graphite sheet has high thermal conductivity in a first direction (along the length), and significantly lower thermal conductivity in a second direction (across the thickness) that contributes to temperature normalization. In some instances, the heat bridge is formed from an anisotropic material that transmits heat well in one direction (such as along a length of the heat bridge) and poorly, or not at all, in another direction (such as through a thickness of the heat bridge). That is, an anisotropic thermal material may preferentially transmit heat in a first direction as opposed to in a second direction. Further, layers may be formed from a single, homogenous substance or homogenous mixture of substances such that the entire material exhibits the thermally anisotropic property. Accordingly, any part of a "layer" or "sheet" of anisotropic thermal material will conduct heat equally well (or poorly).

The pyrolytic graphite sheet or other anisotropic material can also be produced as a thermal bridge for battery cells at low cost and require no maintenance when installed in a battery system, as compared with active cooling systems or other complex and expensive cooling and temperature normalization systems. Additionally, in battery packs with cylindrical cells, unused space between the cylindrical cells may be used for providing the conductors and/or insulators as described herein without increasing the footprint of the battery pack. For instance, in the event of thermal runaway of a particular cell, the conductor may transfer heat around the adjacent cells to the cooling element rather than directly to the adjacent cells, thereby preventing thermal runaway events across multiple cells of the battery pack. Additionally, the conductor may prevent transfer of heat across the thickness of the conductor into the cell from adjacent cells, serving to insulate from heat generated by adjacent cells. In some examples, in the event of failure of a battery cell, the conductors prevent the heat from the failed cell in negatively impacting the surrounding cells by causing heat to transfer preferentially along the pyrolytic graphite sheet to the cooling element rather than into the adjacent cells. Furthermore, the conductor serves to provide an additional wall surrounding the battery cells that may provide a structural benefit to increase the strength of the cells and reduce a risk of cell side rupture. The pyrolytic graphite sheet may be adhered to the cell at the distal end using a thermally conductive adhesive. The pyrolytic graphite sheet can be isolated from the proximal portion of the cell by an insulator. The insulator may include a thermally insulating material having a thermal conductivity lower than the conductor, in some examples having a thermal conductivity an order of magnitude smaller than the thermal conductivity of the conductor and forms a barrier between the proximate portion of the cell and the pyrolytic graphite sheet. The use of the pyrolytic graphite sheet and the insulator enables heat to transfer directly from the proximate portion of the cell to the cooling element and also enables heat to simultaneously transfer from the distal portion of the cell through the pyrolytic graphite sheet to the cooling element without transferring across or through the proximate portion of the cell.

The additional heat transfer path may be formed through the use of various different materials in combination with the isolation from the proximate portion of the cell using the insulator. Generally, the thermal conductance of a material may be determined based on an area, thickness, and thermal conductivity. The thermal conductance of a material is represented by $\lambda = kA/L$, where $\lambda$ is the thermal conductance, $k$ is the thermal conductivity, $A$ is the cross-sectional area, and $L$ is the thickness of the material. The use of high thermal conductivity materials for the casing of the cell as well as the heat transfer path causes heat to preferentially flow through the relatively high thermal conductance paths provided by the cell body (e.g., formed of a metal) and the additional heat transfer path (e.g., formed of pyrolytic graphite) to the cooling element.

Moreover, the thermal conductivity of materials (e.g., the thermally conducting member) may be affected by a number of factors, including temperature of the material itself and electrical conductivity and these properties may change over time. Accordingly, optimal conditions may change over time. Because it may be difficult or otherwise cost-prohibitive to change some or all of the structural components in a battery assembly, it may be desirable to aim for the optimal heat transfer characteristics based on some point in the life cycle of the battery. This point may be near the beginning of the life cycle of the battery, in the middle of the life cycle of the battery, or near the end of the life cycle of the battery. In some embodiments, the battery may be optimized based on one or more systems it supports or systems that it is supported by. For example, various thermal characteristics of the battery may be optimized based on a number of miles that an electric vehicle that uses the battery is expected to last. That is, if an electric vehicle is expected to last for 100,000 miles, the number of charge/discharge cycles required to drive the vehicle 100,000 miles may be calculated (on average, for example) and one or more optimal thermal characteristics may be based on that number. This is, of course, only one example of the many potential design considerations that a battery may be designed to optimize.

The additional heat transfer path, referred to herein as the heat bridge, may be made of any suitable material. In some instances, the heat bridge is formed from an anisotropic material that transmits heat well in one direction (such as along a length of the heat bridge) and poorly, or not at all, in another direction (such as through a thickness of the heat bridge). That is, an anisotropic thermal material may preferentially transmit heat in a first direction as opposed to in a second direction. Further, layers may be formed from a single, homogenous substance or homogenous mixture of substances such that the entire material exhibits the thermally anisotropic property. Accordingly, any part of a "layer" or "sheet" of anisotropic thermal material will conduct heat equally well (or poorly).

In examples, heat bridges described herein may be formed from pyrolytic graphite in whole or in part, insofar as pyrolytic graphite exhibits the aforementioned anisotropic heat transfer function. Rather than dissipate through the thickness of the graphite sheet, heat travels primarily along the length of the sheet thus conducting heat in a desired path to a particular destination (e.g., the cooling element) without significant heat transfer to adjacent cells (e.g., radially outward from a particular battery cell). The pyrolytic graphite can be configured to transfer heat along its length and resist heat transfer through its thickness. Pyrolytic carbon may function similarly and thus may also be used in various embodiments discussed herein.

Anisotropic heat bridges may be used to construct multi-layered heat bridges. Generally, an anisotropic heat bridge conducts heat well in one direction (a "preferred direction") and poorly, or not at all, in other directions. Typically, some minimal heat conduction still occurs in the other directions but the effective distance along which thermal energy may be conducted is limited; a maximum conductive distance exists in such directions. This maximum conductive distance, referred to herein as the "effective dimension," varies with the material used to form a layer of the heat spreader. Increasing size beyond the effective dimension does not increase the capacity of the material to transmit heat, even along the preferred direction of heat transfer (e.g., along a length of the anisotropic material).

For example, pyrolytic graphite sheets transfer heat well in one direction (e.g., along the sheet or parallel with the pyrolytic graphite sheet), but heat dissipation is limited after about 40 microns in a non-transferring direction. 40 microns (or thereabouts) is thus the effective dimension of pyrolytic graphite.

Consider a pyrolytic graphite sheet configured to transfer heat along its length and resist heat transfer along its height (e.g., thickness). Increasing the thickness of the graphite sheet does not substantially change the heat transfer characteristics of the sheet once the effective dimension is exceeded. Thus, pyrolytic graphite and other materials that anisotropically transfer heat ("anisotropic thermal materials") may be formed into layers in order to provide multiple channels or paths for heat transfer in a preferred direction; each such layer may have approximately the effective dimension or greater in a non-preferred direction, in order to reduce, minimize or prevent heat transfer between layers. Accordingly, the pyrolytic graphite may be kept to a thickness such that the structure of a battery cell may be maintained without requiring any change, or only a slight change, in spacing between battery cells.

In some examples, the heat bridges may be formed of other materials, including other thermal conductors, either isotropic or anisotropic, and in some examples may include liquids. In some instances, the battery pack may have a liquid stored therein that fills spaces between individual cells and therefore provides a thermal conductivity path to the cooling element through the liquid. In such examples, the battery may be an enclosed unit and the battery cells may be insulated at the proximate end to limit heat transfer from the proximate end to the liquid because heat transfer at the proximate end is primarily through contact with the cooling element and the body of the cell. Therefore, the liquid may also serve to normalize temperatures within the cells. In some examples, the insulator may include a vacuum insulator that includes a shell surrounding the cell that forms an air gap that may be an air gap or vacuum insulator between the cell wall and the liquid. In some examples, the vacuum insulation may be built into the cell wall itself for only a portion of the cell positioned near the cooling element. Because the liquid is being used for heat transfer to a cooling element, the liquid need not be circulated by a cooling system that may introduce other complexities and need not be a liquid configured to cool through phase changes but may be used to provide heat transfer to the cooling element from the distal portion of the cell. Due to these factors, the battery including the liquid may be substantially simpler than typical battery systems that use flooded liquid cooling but rely on phase changes or circulation through the use of pumps of the liquid.

The techniques described herein, for providing additional thermal pathways to provide parallel heat transfer paths from proximate and distal ends of the cells is not limited to use in any particular cell type, design, or shape but may be implemented across all types of cell designs and battery designs. For instance, cells may be cylindrical, prismatic, pouch, and/or blade shaped and may benefit from the techniques described herein.

The systems described herein, particularly including the additional heat transfer path that enables heat transfer from the distal portion of the cell independent of heat transfer from the proximate portion of the cell, enables the battery cell to maintain a normalized and even temperature profile across the cell that improves battery performance and lifespan. Additionally, the systems described herein provide low cost and low-impact mechanisms for achieving the benefits described herein. For example, the use of pyrolytic graphite sheets as thermal conductors, along with thin insulation layers, enables the performance benefits with only a marginal increase in the diameter of the battery cells, and without requiring additional more expensive components such as additional cooling elements or more complex cooling structures.

FIG. 1 is an illustration of a vehicle 100, such as an autonomous vehicle, having one or more batteries configured with thermal runaway mitigation systems to provide power to operating systems of the vehicle 100, in accordance with examples of the disclosure.

In the illustrated example, the vehicle 100 includes a first drive assembly 102A and a second drive assembly 102B (collectively "drive assemblies 102") coupled to a body 104. Each of the drive assemblies 102 in this example includes multiple vehicle systems. For example, the first drive assembly 102A in this example includes a first battery 106A with a thermal management system and a first cooling system 108A, and the second drive assembly 102B includes a second battery 106B with a thermal management system and a second cooling system 108B. The first battery 106A with a thermal management system and the second battery 106B with a thermal management system may be referred to collectively as "batteries 106," and the first cooling system 108A and the second cooling system 108B may be referred to collectively as "cooling systems 108." Each of the first drive assemblies in this example also include one or more motor(s) 110 and one or more other systems 112. In some examples, motor(s) 110 comprise or can be part of a propulsion system of the vehicle. By way of example and not limitation, the one or more other systems 112 may comprise a steering system, a braking system, a suspension system, related controls and actuators for the forgoing systems, electronics related to supplying power from the one or more batteries 106 to one or more other components or systems of the drive assemblies 102 and/or the body 104. In some examples, the propulsion systems may also include exterior lighting, body panels, facia, and/or sensors.

The body 104 in this example includes one or more computer systems 114 to control operation of one or more systems of the vehicle 100. For instance, in the case of an autonomous vehicle, the computer systems 114 may include one or more processors and memory and may be configured to control the vehicle 100 to, among other things, receive and process sensor data from one or more sensors and to plan a route for the vehicle through an environment.

Though described with respect to the vehicle 100 in the example of FIG. 1, the battery thermal management systems described herein may be implemented in other types of vehicles including electric vehicles of all types and may be implemented in non-vehicular applications such as power storage, backup power delivery, battery packs, and other such implementations.

In some examples, the cooling systems 108 may be used to cool the batteries 106 by circulating coolant from the cooling systems 108 to and/or through the batteries 106 via one or more fluid circuits to transfer thermal energy away from the batteries 106 to at least one of the cooling systems 108. The cooling systems 108 may also be used to cool one or more other systems of the vehicle 100. For instance, in some examples the first cooling system 108A and/or the second cooling system 108B may comprise a heating ventilation and air conditioning (HVAC) system used to cool a passenger compartment of the vehicle. In examples, in some examples the first cooling system 108A and/or the second cooling system 108B may provide cooling to the motor(s) 110 of the first drive assembly 102A and/or the second drive assembly 102B. By way of example and not limitation, the cooling systems 108 may include one or more reservoirs, circulation systems, heat exchangers, condensers, compressors, valves, and/or controllers to provide cooling and/or thermal management to various components and/or systems of vehicle 100.

As shown in FIG. 1, the first battery 106A with a thermal management system includes a battery pack 116 shown in the detail view outlined in dashed lines. While not shown in FIG. 1, the second battery 106B with a thermal management system also includes a battery pack 116. Thus, in the illustrative example of FIG. 1, the vehicle 100 includes two battery packs. In other examples, the vehicle 100 may include a greater or lesser number of battery packs.

Each of the battery packs 116 may be configured with one or more battery assemblies 118(1), 118(2), . . . 118(N) (collectively "battery assemblies 118"), where N is any integer greater than or equal to 1 (e.g., batteries, battery subsystems, etc.). In the illustrative example, each of the battery packs 116 include six battery assemblies 118 configured in a stack. In other examples, the battery packs 116 may include a greater or lesser number of battery assemblies 118. Additionally, in other examples, the battery assemblies 118 may be configured differently, such as substantially horizontally, substantially vertically, rotated 90 degrees from that shown in FIG. 1, and/or in any other configuration.

In some examples, the battery assemblies 118 may be coupled to a casing 120 of the battery pack 116. The casing 120 may include a metal material (e.g., aluminum, steel, titanium, etc.), a plastic material (e.g., polymer, etc.), a ceramic material, a composite material (e.g., fiberglass, carbon fiber, Kevlar, etc.), or a combination thereof. In at least one example, the casing 120 may include a metal material, formed via an extrusion process. In some examples, the casing 120 may include a base, a cover, and four side walls including a front side wall, a rear side wall, a right-side wall and a left side wall (e.g., first side wall, second side wall, third side wall, fourth side wall). Although illustrated as a cross section, with one side of the casing 120 removed, the casing 120 of the battery pack 116 may be configured to envelope the battery assemblies 118 on all sides. In some examples, the casing 120 of the battery pack 116 may be configured to be substantially waterproof and/or water resistant.

In some examples, each battery assembly 118 may be configured to couple to a casing attachment mechanism. In some examples, the casing attachment mechanism may include rails 122(1), 122(2), . . . 122(M) (collectively "rails 122"), where M is any integer greater than or equal to 1. The number of pairs of rails M may or may not be equal to the number of battery assemblies N. The rails 122 may include a metal material, a ceramic material, a composite material, a plastic material, or a combination of the foregoing. The rails 122 may include the same material or a different material than the casing 120. In some examples, the rails 122 may be disposed on an internal surface of the front side wall (e.g., first side wall) and the rear side wall (e.g., second side wall) in a substantially horizontal configuration. In some examples, the rails 122 may extend from a first end, substantially situated at the right-side wall (e.g., third side wall), to a second end, substantially situated at the left side wall (e.g., fourth side wall). In such examples, the rails 122 may substantially extend a length of the casing 120.

The rails 122 may be configured to connect to couplers on opposing sides of a battery assembly 118 (e.g., exterior surface of a battery housing). In some examples, the rails 122 may include a coating. The coating may include rubber, polyurethane, nylon, Teflon, silicone, polypropylene, polyethylene, or the like. In some examples, the coating may be configured to increase and/or decrease a frictional component between the rails 122 and the couplers of the battery assemblies 118. In some examples, the coating may be configured to assist in substantially thermally isolating heat of one battery assembly (e.g., battery assembly 118(1)) from affecting another battery assembly (e.g., battery assembly 118(2). In such examples, the coating may assist in preventing gases, such as those emitted from a battery assembly during thermal runaway, from propagating to the other battery assembly.

In the illustrative example, the rails 122 can be configured in pairs of rails 122 disposed on opposite internal surfaces of the battery pack 116. Each of the pairs of rails 122 can be connected to couplers (e.g., assembly couplers, assembly attachment mechanisms, etc.) on opposite sides of a battery assembly 118. In some examples, the casing attachment mechanism may include a casing coupler disposed on an internal surface opposite a rail 122. In such examples, a battery assembly 118 may be configured to couple to a casing coupler via a rail disposed on the battery assembly 118 on one side and a rail 122 of the battery pack 116 via an assembly coupler on the other side. In some examples, the opposing internal surfaces of the battery pack 116 may include alternating rails 122 and casing couplers. For example, a casing coupler may be disposed between two rails. In some examples, the opposing internal surfaces of the battery pack 116 may include casing couplers on a first internal surface and rails 122 on a second internal surface, the first internal surface and the second internal surface being opposite internal side walls.

In some examples, each rail 122 may be disposed at a substantially equal distance vertically from one another. In such examples, each battery assembly 118 may be spaced a substantially similar vertical distance from another battery assembly 118 inserted into the casing 120. For example, after insertion, such as via sliding the couplers of the battery assembly 118 along the rails 122, a bottom side of a first battery assembly 118(1) may be spaced a distance from a top side (e.g., cover) of a second battery assembly 118(2). The distance may provide an air gap configured to prevent direct thermal conduction between the first battery assembly 118 (1) and the second battery assembly 118(2).

Additionally, in some examples, after insertion, the battery assemblies 118 may be secured into the casing via one or more fasteners (e.g., screws, rivets, pins, snap connectors, latches, spring-type fasteners, etc.) at an end of the rails 122.

In some examples, the coupling of the battery assemblies 118 in the casing 120 via one or more pairs of rails 122 results in a battery pack 116 that is relatively stiff and rigid. The stiffness of the battery pack 116 may increase a torsional and/or lateral stiffness of the vehicle 100. In such examples, the stiffness of the battery pack 116 may increase the handling, steering, and/or ride characteristics of the vehicle 100. In at least one example, one or more battery assemblies 118 in the battery pack 116 may be offset from other battery assemblies 118 in the battery pack 116. For example, as illustrated in FIG. 1, the bottom two battery assemblies 118 in the battery packs 116 can be offset from a vertical stack of four other battery assemblies 118. The offset design of one or more of the battery assemblies 118 may additionally increase a stiffness of the battery pack 116, further improving torsional and/or lateral stiffness of the vehicle 100. In some examples, an increase in the torsional and/or stiffness of the vehicle may also minimize vibration of the battery pack 116, reducing the risk of damage to cells of the battery pack which could lead to thermal runaway. In some examples, the battery assemblies 118 in a battery pack 116 may be configured substantially the same or similar to one another. In such examples, the battery assemblies 118 in a battery pack 116 may be interchangeable. The battery assemblies 118 may include a battery assembly housing including at least a base and four side walls. At least two of the four side walls may be configured with the couplers described above that can be configured to slide along the rails 122 in the casing 120. In some examples, the at least two of the four side walls may be configured with an assembly attachment mechanism configured to couple to a casing attachment mechanism, such as those described above. In such examples, the casing attachment mechanism may include at least a rail, or a coupler and the corresponding assembly attachment mechanism may include the other of the rail or the coupler. In some examples, the battery assembly housing may additionally include a cover.

As described above, the battery assembly housing may comprise a metal, a ceramic, a plastic, a composite material, or a combination thereof. The base, four side walls, and the cover may comprise a same or similar material. In some examples, the base, the four side walls, and/or the cover may include an insulating material (e.g., mica, silicone rubber, Teflon, etc.). In some examples, those insulating materials may be coupled to (e.g., laminated, glued, etc.) other materials (e.g., metal, ceramic, plastic, or combinations thereof), for example, for structural, protection, and/or durability purposes.

As shown in the battery assembly 134, the battery housing may enclose a plurality of cells 140 of the battery assembly 118. Each cell 140 of the plurality of cells may include a cylindrical cell, a pouch cell, a prismatic cell, a button cell, or the like. In some examples, the cells 140 in the plurality of cells can be cylindrical cells. In some examples, the plurality of cells 140 may be separated from one another by an insulating material. In some examples, the insulating material may comprise an insulating foam (e.g., silicone foam, silicone potting, etc.). In some examples, the insulating material disposed between individual cells of the plurality of cells may substantially fill an interstitial space between the cells and may mitigate effects of thermal runaway of a single cell by isolating the cell from other cells proximate thereto. In such examples, the insulating material may enhance thermal runaway mitigation techniques by thermally isolating the cells from one another. The cells 140 can be electrically coupled to a bus 138 that connects to each of the cells 140 for power delivery to the vehicle 100.

In some examples, one or more of the cooling systems 108 provide coolant to the battery assemblies 118, specifically to a cooling element 136 which may include a cooling plate to receive heat from the cells 140 and discharge the heat to the cooling system 108. In the illustrated example, coolant is supplied to the battery assemblies 118 via a coolant manifold 124 connecting through port 126 on a battery assembly 118. The coolant may be supplied to the coolant manifold 124 by the first cooling system 108A and/or the second cooling system 108B of vehicle 100 via connection port 128. The cells 140 can be cooled by the cooling element during charging and/or discharging to reduce impacts of heat buildup on the cells, such as reduced lifespan and thermal runaway.

The cells 140 can be arranged within an array of the battery assembly 134, which may be an example of the battery assembly 118. The cells 140 have a first end adjacent the cooling element 136, such as a cooling plate or other thermal regulation component for transferring heat from the cells 140 to a remote location for discharge. In this configuration, the cells 140 can transfer heat through the first end to the cooling element 136, but such heat transfer alone may result in uneven temperature across the cells 140 as the remote portions of the cells 140 from the cooling element may remain at high temperature while the portions of the cells 140 proximate to the cooling element 136 can be cooled. Such temperature gradients can result in undesirable performance, thermal runaway, decreased capacity, and decreased lifespan for the cell. The cells 140 can be equipped with a heat bridge, as shown with respect to FIGS. 2-7. The examples illustrated in FIGS. 2-7 may illustrate examples of the battery assembly 134 as shown in the detail view 142. The heat bridge provides a thermal transfer bridge from the remote or distal portions (such as near or adjacent the bus 138) of the cells 140 to the cooling element 136 that bypasses the portions of the cells 140 proximate the cooling element 136. In this manner, the cells 140 may transfer heat from both ends and/or across the entire length of the cells 140 to the cooling element and thereby normalize the temperature within the cells 140 during charging and/or discharging.

In the illustrative example, the heat bridge includes a thermally conductive material in contact with the distal portion of the cells 140 (e.g., adjacent or proximate the bus 138), isolated from the proximate portion of the cells 140 by an insulator, and thermally coupled with the cooling element 136.

The heat bridge additional heat transfer path may be formed through the use of various different materials in combination with the isolation from the proximate portion of the cells 140 using the insulator. The use of high thermal conductivity materials for the casing of the cells 140 as well as the heat bridge causes heat to preferentially flow through the relatively high thermal conductance paths provided by the cell body (e.g., formed of a metal) and the heat bridge (e.g., formed of pyrolytic graphite) to the cooling element 136.

As discussed above, in some examples the first cooling system 108A and the second cooling system 108B may be separate systems that are not in fluid communication with one another. For example, the first cooling system 108A may provide coolant to the battery pack 116 of the first battery 106A from a first coolant circuit including a first coolant reservoir, and the second cooling system 108B may provide coolant to the battery pack 116 of the second battery 106B from a second coolant circuit including a second coolant reservoir. In this example, the battery packs 116 of the first battery 106A and the second battery 106B are not in fluid communication with each other.

In other examples, the first cooling system 108A may be in fluid communication with the second cooling system 108B. For instance, the first cooling system 108A may provide coolant to the battery packs 116 of both the first battery 106A and the second battery 106B from a common coolant circuit. In this example, the battery packs 116 of the first battery 106A and the second battery 106B are in fluid communication with each other.

Additionally, or alternatively, in some examples the first cooling system 108A and the second cooling system 108B may be selectively connected or disconnected. For example, it may be desirable to operate the first battery 106A and second battery 106B as separate systems in some circumstances (e.g., during normal operation), and may be desirable to operate the first battery 106A and the second battery 106B from a common system in other circumstances (e.g., upon detecting occurrence of a thermal runaway event). For example, operating from separate cooling systems may allow control of the cooling and flowrates of the coolant to each battery pack 116 based on the status and condition of each battery pack 116 which may result in more efficient cooling. Additionally, or alternatively, separate cooling systems provides a level of redundancy such that a failure in a first cooling system does not affect a second cooling system and may allow the second cooling system to supply sufficient cooling to a battery pack. Additionally, or alternatively, providing control to connect or disconnect the cooling systems 108 provides flexibility to provide cooling to two or more battery packs 116 from a common cooling system or reservoir when needed. For example, during a thermal runaway event, it may be desirable to provide additional coolant to the battery pack 116 experiencing the thermal runaway event.

In some examples, the computer systems 114 control operation of one or more systems of the vehicle 100. For instance, in the case of an autonomous vehicle, the computer systems 114 may include one or more processor(s) 130 and memory 132 communicatively coupled with the one or more processor(s) 130 and may be configured to control the vehicle 100 to, among other things, receive and process sensor data from one or more sensors and to plan a route for the vehicle through an environment.

In the illustrated example, the vehicle 100 is an autonomous vehicle; however, the vehicle 100 could be any other type of vehicle, such as a semi-autonomous vehicle, or any other system having at least an image capture device (e.g., a camera enabled smartphone). Though depicted in FIG. 1 as residing in the body 104 for illustrative purposes, it is contemplated that the computer systems 114 be accessible to the vehicle 100 (e.g., stored on, or otherwise accessible by, memory remote from the vehicle 100, such as, for example, on memory of a remote computer device). In some examples, multiple computer systems 114 may be included on the vehicle 100. In some examples, computer systems 114 may be located within the body 104, a drive assembly 102, or combinations thereof.

The processor(s) 130 of the vehicle 100 may be any suitable processor capable of executing instructions to process data and perform operations as described herein. By way of example and not limitation, the processor(s) 130 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICS, etc.), gate arrays (e.g., FPGAs, etc.), and other hardware devices may also be considered processors in so far as they are configured to implement encoded instructions.

Memory 132 is an example of non-transitory computer-readable media. Memory 132 may store an operating system and one or more software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying FIGURES are merely examples that are related to the discussion herein.

In some instances, memory 132 may include at least a working memory and a storage memory. For example, the working memory may be a high-speed memory of limited capacity (e.g., cache memory) that is used for storing data to be operated on by the processor(s) 130. In some instances, memory 132 may include a storage memory that may be a lower-speed memory of relatively large capacity that is used for long-term storage of data. In some cases, the processor(s) 130 cannot operate directly on data that is stored in the storage memory, and data may need to be loaded into a working memory for performing operations based on the data, as discussed herein.

Figure 2:
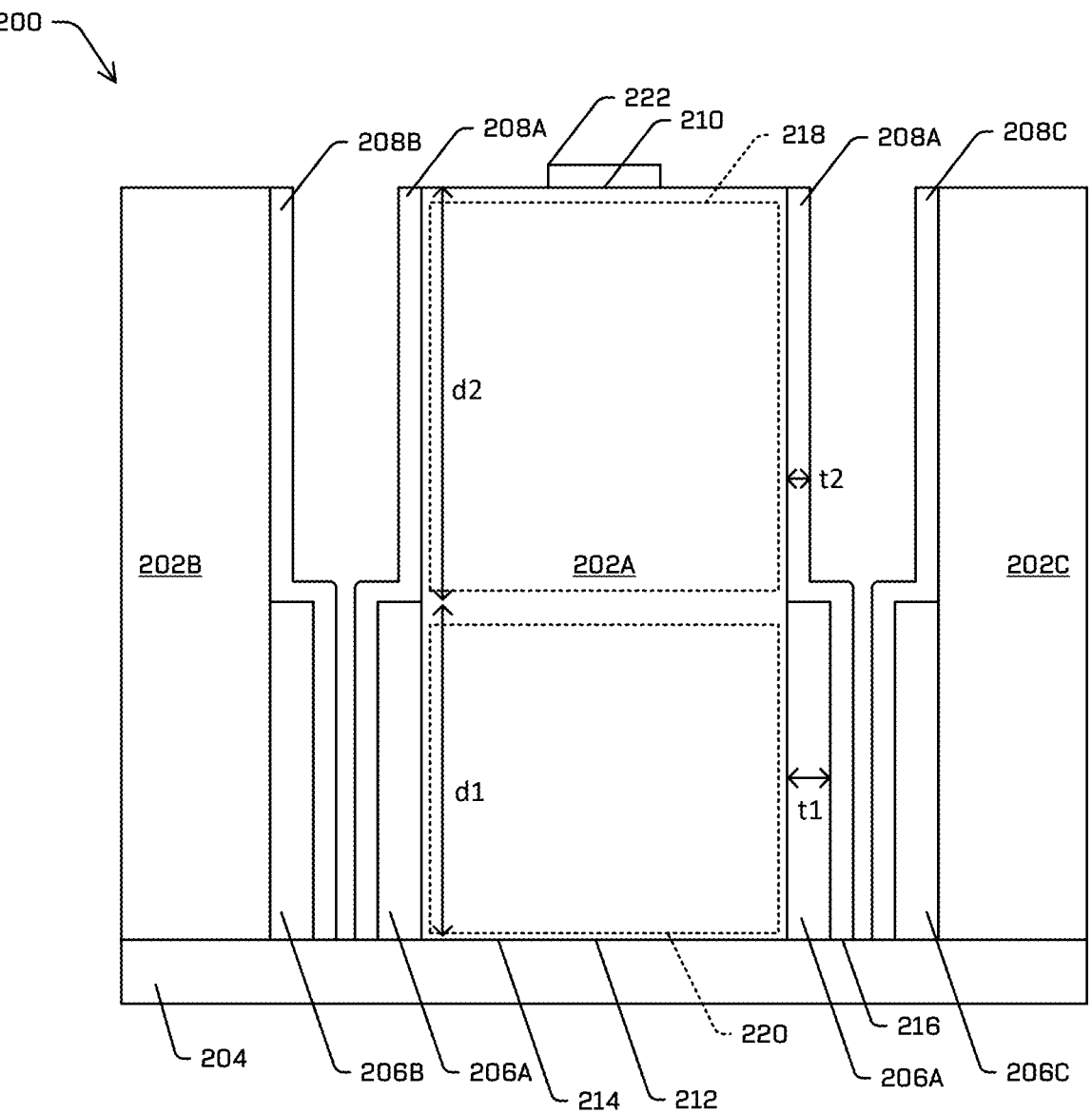
FIG. 2 is a section view of a battery pack of battery cells with thermal equalization devices, according to at least one example.

FIG. 2 is a detail view 200 of a battery pack of battery cells 202A, 202B, and 202C (collectively "cells 202") with thermal equalization devices, according to at least one example. The cells 202 may be any type and/or composition of battery cells such as lithium-ion battery cells. The cells 202 may include a cylindrical cell, a pouch cell, a prismatic cell, a button cell, or the like. The cells 202 may have a body formed of a metal or other thermally conductive material that contains the components of the cell and also enables thermal transfer through the body of the cells 202. The cells 202 have electrical connections 222 at a first end 210 for connecting to a bus bar or otherwise electrically connecting to the other cells in the battery pack. The electrical connections 222 are separated from the heat bridge 208 and other elements of the cooling system. The cells 202 additionally couple to a cooling element 204 at a second end 212. The cells 202 couple to the cooling element 204 with a thermally conductive adhesive 214 to enable heat transfer from the body of the cells 202 to the cooling element 204, which may include a cold plate or other cooling element for removing heat from the battery pack. Heat transfer directly through the second end 212 to the cooling element 204 as the cells 202 heat due to charging and/or discharging of the battery pack.

The battery pack includes heat bridges 208A, 208B, and 208C (collectively "heat bridges 208") that enable transfer from at and/or near the first end of the cells 202 to the cooling element 204 bypassing the second end 212. Therefore, heat generated at or near the first end 210 may transfer to the cooling element 204 without having to pass through the length of the cells 202. The heat generated at or within a first region 218 of the cells 202 may include a distal portion of the cells 202 from the cooling element 204. Such heat may be transferred to the cooling element 204 through heat bridges 208. The heat bridges 208 can be isolated from a second region 220 of the cells 202 by insulators 206A, 206B, and 206C (collectively "insulators 206"). The insulators 206 prevent or resist transfer of heat from the second region 220 to the heat bridges 208 and therefore enables the heat from the first region 218 to transfer through the heat bridges 208 to the cooling element 204. The insulators 206 have a thickness t1 that resists heat transfer to the heat bridges 208 from the second region 220. The insulators 206 may be formed of any suitable thermally insulating material, such as rubber, foam, plastic, ceramic, composites, or other such materials. In some examples, the insulators 206 may be formed of mica (e.g., a material having anisotropic thermal conductivity properties) and/or an aerogel material, among other materials having thermal conductivity significantly lower than the thermal conductivity of the heat bridge 208. The thickness t1 may be in a range of about one millimeter to about five millimeters in thickness. In some examples, the thickness t1 may be variable over the length of the insulators 206, from a first thickness adjacent the cooling element 204 to a second thickness at a distal end of the insulators 206. The second thickness may be less than the first thickness such that heat transfer to the heat bridge 208 from a middle portion of the cells 202 through the insulator is impeded less than heat transfer to the heat bridges 208 at a location adjacent the cooling element 204. In some examples, having the varying thickness, as described above, results in a tapered shape from a thinner portion at the middle of the cell to a thicker portion adjacent the cooling element 204 that may enable the heat bridges to be stamped and slid onto the battery cells and/or to be formed onto the cells during manufacturing. In such examples, the insulators may have a rounded corner or edge at the middle portion of the cells 202 such that the heat bridges 208 may be added or slid onto the cells 202 and the insulators 206. In some examples, the thickness of the insulators 206 may vary around the diameter of the cells 202 such that at locations around the diameter where a distance between cells is greater (e.g., due to the cylindrical shapes of the cells) then the thickness of the insulator may be increased to fill that space. This may result in an insulator that has a varying radial thickness around the diameter of the cells 202. Heat generated at or within the second region 220 may be transferred to the cooling element 204 through the second end 212. Therefore, the heat bridges 208 may enable heat transfer that results in a more even temperature distribution over the cells 202 than would otherwise be possible.

The heat bridges 208 include a thermally conductive material in contact with the first region 218 of battery cell 202A, isolated from the proximate portion (e.g., the second region 220) of the cell 202A, and thermally coupled with the cooling element 204. The heat bridges 208 may entirely surround the first region 218 of the cells 202. For example, a cylindrical cell may have a cylindrical heat bridge coupled at the first region 218. The heat bridges 208 may include a pyrolytic graphite sheet or other thermal conductor that is relatively thin, e.g., having a thickness t2 in a range of less than a millimeter to several millimeters in thickness. In some examples, the thickness t2 may include a thickness of a stacked set of sheets, with the sheets having a thickness in a range of 1 to 20 micrometers, with a stacked set including ten or more sheets, resulting in a thickness in a range of 10-200 micrometers. The thickness t2 may be kept as small as possible in some examples to minimize any impact on spacing between cells 202 (e.g., without requiring additional spacing between cells 202 than in a present configuration). The heat bridges 208 may be adhered to the cells 202 at the distal end and/or at the first region 218 using a thermally conductive adhesive to enable heat transfer from the first region 218 to the heat bridges 208. The heat bridges 208 further couple to the cooling element 204 using a thermally conductive adhesive 216 that may be the same as the thermally conductive adhesive 214.

The insulators 206 may extend a first distance, d1, along the length of the cells 202 and the heat bridges 208 may be in contact with the cells 202 over a second distance, d2, at the first region 218. In some examples, the first distance, d1, may be in a range from about one-third to one-half of the length of the cells 202, with the second distance, d2, making up a remainder of the length of the cells 202. In some examples, the proportion between the lengths d1 and d2 may be related to the heat transfer properties of the heat bridges 208 and the body of the cells 202. For instance, the ratio of the lengths d1:d2 may correspond to a ratio of the thermal conductivity of the heat transfer from the body of the cells 202 directly to the cooling plate (e.g., the thermal conductivity of the thermally conductive adhesive 214 and/or the material forming the body of the cells 202) as compared with the thermal conductivity of the material forming the heat bridges 208.

The heat bridges 208 may be formed through the use of various different materials in combination with the isolation from the proximate portion of the cell using the insulator. Generally, the thermal conductance of a material may be determined based on an area, thickness, and thermal conductivity. The thermal conductance of a material is represented by $\lambda = kA/L$, where $\lambda$ is the thermal conductance, k is the thermal conductivity, A is the cross-sectional area, and L is the thickness of the material. The use of high thermal conductivity materials for the casing of the cell 202 as well as the heat bridges 208 causes heat to preferentially flow through the relatively high thermal conductance paths provided by the cell body (e.g., formed of a metal) and the heat bridges 208 (e.g., formed of pyrolytic graphite) to the cooling element 204.

The heat bridges 208 may be made of any suitable material: in some instances, the heat bridges 208 can be formed from an anisotropic material that transmits heat well in one direction (such as along a length of the heat bridges 208) and poorly, or not at all, in another direction (such as through a thickness of the heat bridges 208). That is, an anisotropic thermal material may preferentially transmit heat in a first direction as opposed to in a second direction. Further, layers may be formed from a single, homogenous substance or homogenous mixture of substances such that the entire material exhibits the thermally anisotropic property. Accordingly, any part of a "layer" or "sheet" of anisotropic thermal material will conduct heat equally well (or poorly).

In examples, the heat bridges 208 may be formed from pyrolytic graphite sheets in whole or in part, insofar as pyrolytic graphite exhibits the aforementioned anisotropic heat transfer function. Rather than dissipate through the thickness of the pyrolytic graphite sheet (perpendicular to a direction parallel with the length of the cells 202 and/or the length of the heat bridges 208), heat travels primarily along the length of the sheet thus conducting heat in a desired path to a particular destination (e.g., the cooling element 204) without significant heat transfer to adjacent cells (e.g., radially outward from cells 202). The pyrolytic graphite sheet can be configured to transfer heat along its length and resist heat transfer through its thickness. Pyrolytic carbon may function similarly and thus may also be used in various embodiments discussed herein.

Anisotropic heat bridges may be used to construct multi-layered heat bridges. Generally, an anisotropic heat bridge conducts heat well in one direction (a "preferred direction") and poorly, or not at all, in other directions. Typically, some minimal heat conduction still occurs in the other directions but the effective distance along which thermal energy may be conducted is limited; a maximum conductive distance exists in such directions. This maximum conductive distance, referred to herein as the "effective dimension," varies with the material used to form a layer of the heat spreader. Increasing size beyond the effective dimension does not increase the capacity of the material to transmit heat, even along the preferred direction of heat transfer.

For example, pyrolytic graphite sheets transfer heat well in one direction (e.g., along the sheet or parallel with the pyrolytic graphite sheet), but heat dissipation is limited after about 40 microns in a non-transferring direction. 40 microns (or thereabouts) is thus the effective dimension of pyrolytic graphite.

In some examples, the pyrolytic graphite sheet may transfer heat along its length (e.g., along the length of the heat bridges 208) and resist heat transfer along its height (e.g., thickness of the heat bridges 208). Increasing the thickness of the pyrolytic graphite sheet does not substantially change the heat transfer characteristics of the sheet once the effective dimension is exceeded. Thus, pyrolytic graphite and other materials that anisotropically transfer heat ("anisotropic thermal materials") may be formed into layers in order to provide multiple channels or paths for heat transfer in a preferred direction: each such layer may have approximately the effective dimension or greater in a non-preferred direction, in order to reduce, minimize or prevent heat transfer between layers. Accordingly, the pyrolytic graphite may be kept to a thickness such that the structure of a battery cell may be maintained without requiring any change, or only a slight change, in spacing between battery cells. In some examples, the heat bridges 208 may be formed of other materials, including other thermal conductors, either isotropic or anisotropic such as metals including aluminum, copper, stainless steel, steel, and other such metals.

Figure 3:
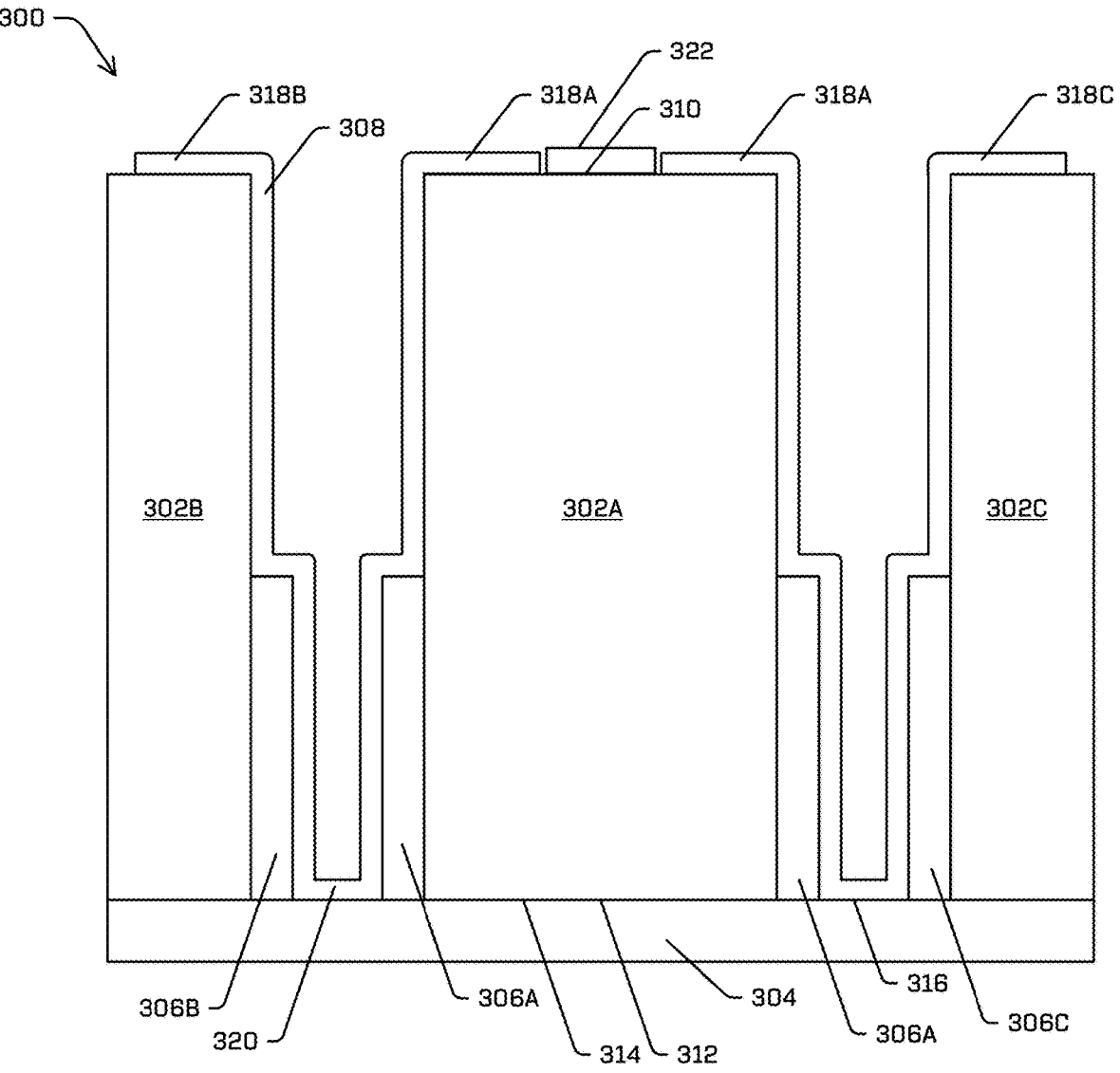
FIG. 3 is a section view of a battery pack of battery cells with thermal equalization devices wrapping around a first end of the battery cells, according to at least one example.

FIG. 3 is a detail view 300 of a battery pack of battery cells 302A, 302B, and 302C (collectively "cells 302") with thermal equalization devices (e.g., heat bridges) wrapping around a first end 310 of the cells 302, according to at least one example. The cells 302 include elements similar to those described with respect to FIG. 2 above. For instance, the cells 302, cooling element 304, insulators 306A, 306B, and 306C (collectively "insulators 306"), first end 310, second end 312, thermally conductive adhesive 314, thermally conductive adhesive 316, and electrical connections 322 may correspond to the cells 202, cooling element 204, insulators 206, first end 210, second end 212, thermally conductive adhesive 214, thermally conductive adhesive 216, and electrical connections 222 of FIG. 2.

The heat bridge 308 of FIG. 3 may be formed of the same or similar materials to those of the heat bridges 208 of FIG. 2 but may have a different shape and/or configuration. As shown in FIG. 3, the heat bridges 308 can be formed of a single sheet, for example of pyrolytic graphite sheet, having cavities or recesses formed therein to receive the cells 302. The heat bridges 308 may therefore be formed as a single sheet with the cells 302 inserted into the recesses during construction of the battery pack. The heat bridges 308 include bottom ends 318A, 318B, and 318C that define openings where electrical connections may be made to the first end 310 of the cells 302. The heat bridges 308 contact a greater surface area of the cells 302 in FIG. 3 than in the example shown in FIG. 2, which may therefore increase heat transfer from the region of the first end 310 into the heat bridges 308 and subsequently to the cooling element 304.

The heat bridge 308 includes webbing 320 between the cells 302 that may be coupled to the cooling element 304 with the thermally conductive adhesive 316 to facilitate heat transfer to the cooling element 304. The webbing 320 may have a length in a range of a few millimeters to a few centimeters based on the arrangement of cells 302 in the battery pack.

Figure 4:
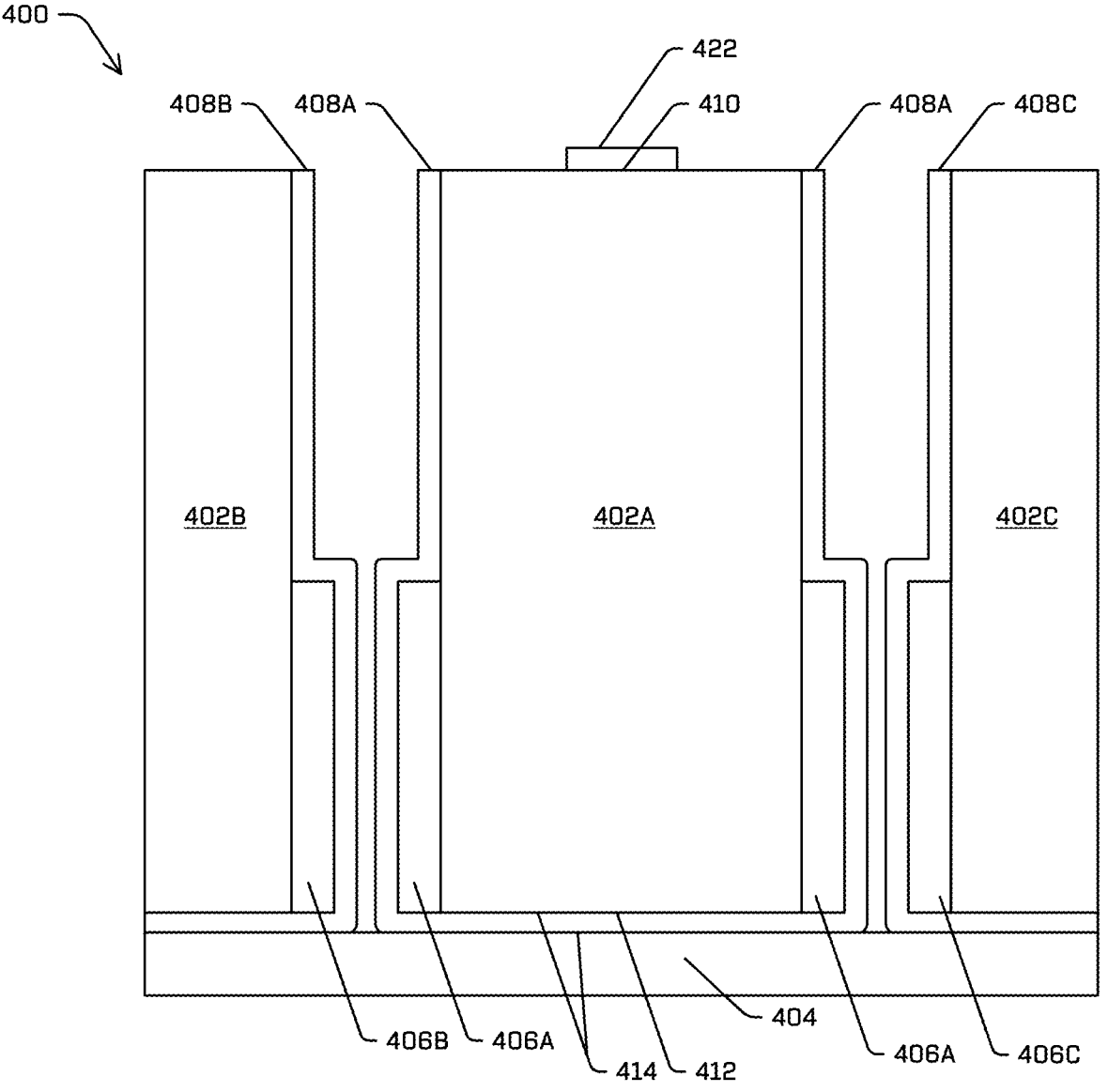
FIG. 4 is a section view of a battery pack of battery cells with thermal equalization devices wrapped around a second end of the battery cells, according to at least one example.

FIG. 4 is a detail view 400 of a battery pack of battery cells 402A, 402B, and 402C (collectively "cells 402") with thermal equalization devices (e.g., heat bridges) wrapping around a second end 412 of the cells 402, according to at least one example. The cells 402 include elements similar to those described with respect to FIGS. 2 and 3 above. For instance, the cells 402, cooling element 404, insulators 406A, 406B, and 406C (collectively "insulators 406"), first end 410, second end 412, thermally conductive adhesive 414, and electrical connections 422 may correspond to the cells 202, cooling element 204, insulators 206, first end 210, second end 212, thermally conductive adhesive 214, and electrical connections 222 of FIG. 2.

In the example of FIG. 4, the cells 402 can be wrapped in the heat bridges 408A, 408B, and 408C (collectively "heat bridges 408") with the exception of the first end 410, where electrical connection may be made to the cells 402. The cells 402 may therefore transfer heat to the heat bridges 408 and subsequently to the cooling element 404. Because the heat bridges 408 surround the proximal and distal regions of the cells 402 (with respect to the cooling element 404), the heat transferred to the cooling element will pass through the heat bridges 408 from any region. In some examples, such as with an anisotropic heat bridge material, including pyrolytic graphite and/or carbon, heat may travel along the heat bridges 408 at a higher rate than across the thickness of the heat bridges 408. Because of this property, the heat bridge 408 may have a near uniform temperature at all locations around the perimeter of the cells 402. This may result in a more uniform and/or even temperature distribution within the cells 402.

In some examples, the heat bridges 408 may contact the body of the cells 402 without the use of the insulators 406. The insulators 406 may, for example, be used to limit heat transfer to the heat bridges 408 at or near the second end 412. In an example without insulators 406, the heat bridges 408, especially when formed of the anisotropic materials described herein, provide a uniform temperature across the surface of the cells 402. In some examples, the body of the cells 402 may be formed of the anisotropic material without an additional heat bridge, as the body of the cells 402 may act as the heat bridge 408 without an insulator 406 in place.

Figure 5:
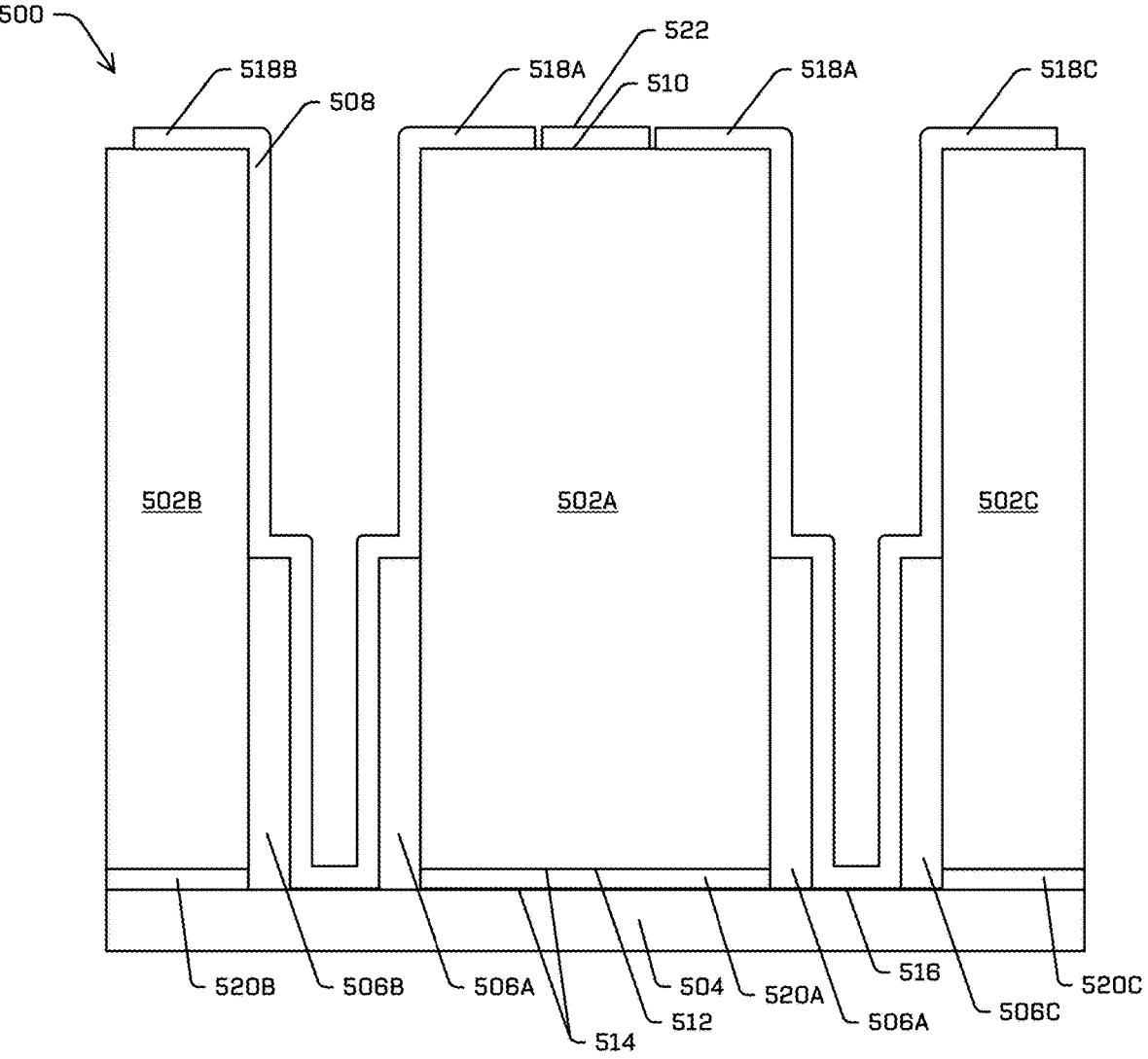
FIG. 5 is a section view of a battery pack of battery cells with thermal equalization devices including an insulator between the battery cells and a cooling element, according to at least one example.

FIG. 5 is a detail view 500 of a battery pack of battery cells 502A, 502B, and 502C (collectively "cells 502") with thermal equalization devices (e.g., heat bridges) including insulators 520A, 520B, and 520C (collectively "insulators 520") between the cells 502 and the cooling element 504, according to at least one example. The cells 502 may include elements similar to those described with respect to FIGS. 2-4 above. For instance, the cells 502, cooling element 504, insulators 506A, 506B, and 506C (collectively "insulators 506"), first end 510, second end 512, thermally conductive adhesive 514, thermally conductive adhesive 516, bottom ends 518A, 518B, and 518C (collectively "bottom ends 518"), and electrical connections 522 may correspond to the cells 302, cooling element 304, insulators 306, first end 310, second end 312, thermally conductive adhesive 314, thermally conductive adhesive 316, bottom ends 318, and electrical connections 322 of FIG. 3.

In addition to the components described above, the detail view 500 shows insulators 520 positioned between the second end 512 and the cooling element 504. The insulators 520 may reduce heat transferred through the second end 512 due to the increased thermal resistance of the insulators 520. The reduced heat transfer may result in a more even temperature gradient over the cells 502. In some examples, the insulators 520 may have a thickness less than the thickness of the insulators 506. The thickness of the insulators 520 may be configured to reduce heat transfer to a particular level, for example through the use of varying materials or thicknesses to change the heat transfer characteristics through the second end 512 to match and/or correspond to heat transfer through the heat bridges 508.

Figure 6:
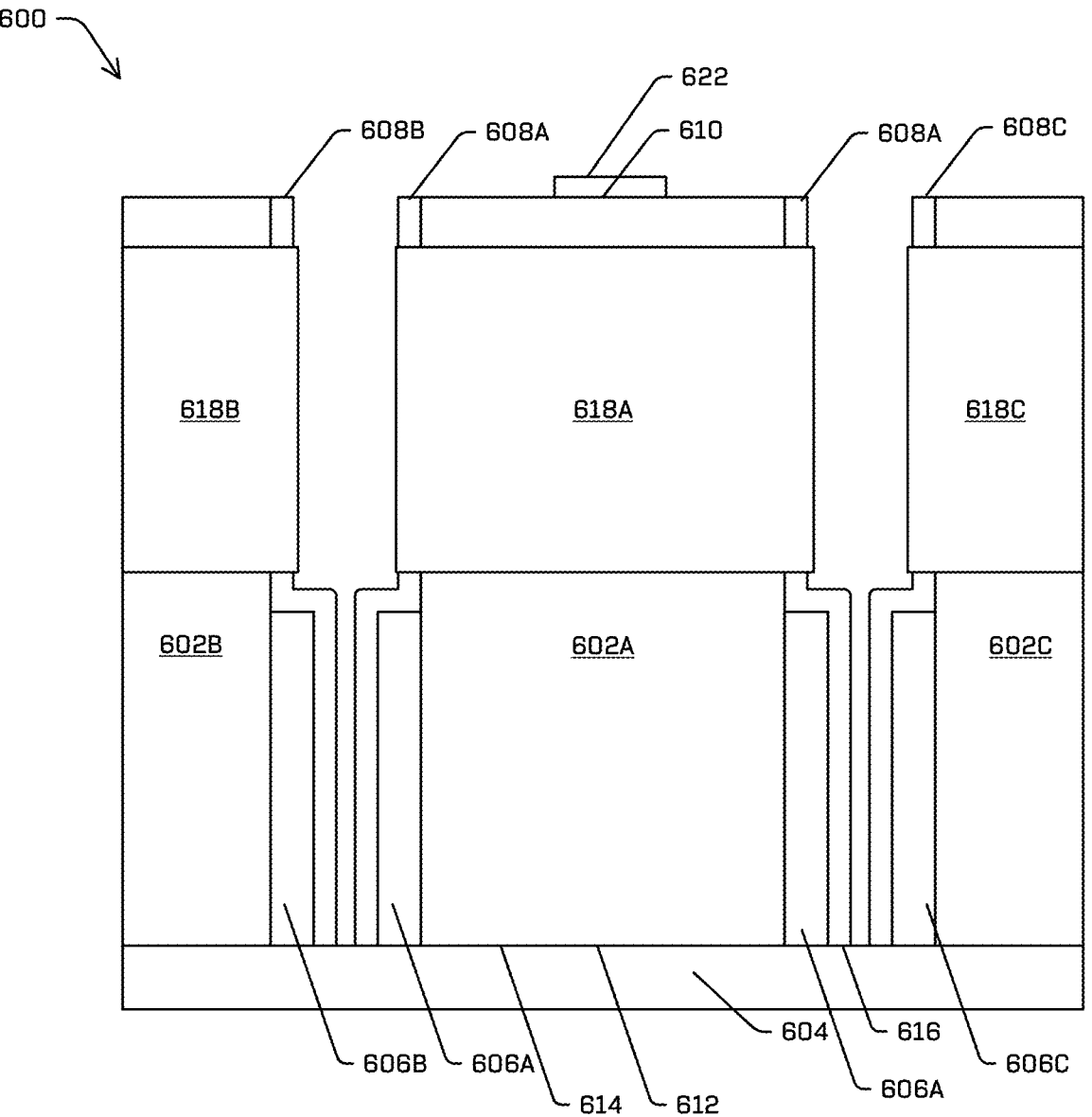
FIG. 6 is a section view of a battery pack of battery cells with thermal equalization devices secured by clamps to the battery cells, according to at least one example.

FIG. 6 is a detail view 600 of a battery pack of battery cells 602A, 602B, 602C (collectively "cells 602") with thermal equalization devices (e.g., heat bridges) secured by clamps 618A, 618B, and 618C (collectively "clamps 618") to the cells 602, according to at least one example. The cells 602 and other components of the detail view 600 may include elements similar to those described with respect to FIG. 2. For instance, the cells 602, cooling element 604, insulators 606A, 606B, and 606C (collectively "insulators 606"), heat bridges 608A, 608B, and 608C (collectively "heat bridges 608"), first end 610, second end 612, thermally conductive adhesive 614, thermally conductive adhesive 616, and electrical connections 622 may correspond to the cells 202, cooling element 204, insulators 206, heat bridges 208, first end 210, second end 212, thermally conductive adhesive 214, thermally conductive adhesive 216, and electrical connections 222 of FIG. 2. The clamps 618 may surround some or all of a portion of the heat bridges 608 in direct contact with the body of the cells 602. The clamps 618 may be formed of a material capable of being in tension such that the clamps 618 may be tightened around the heat bridges 608 and the cells 602 to secure the heat bridges 608 to the cells 602. In some examples, the clamps 618 may be formed of an insulative material to reduce heat transfer radially outward from the cells 602. The clamps 618 may be used in connection with a thermally conductive adhesive between the heat bridges 608 and the cells 602. In some examples, the clamps 618 may apply pressure to the heat bridges 608 such that no thermally conductive adhesive is between the heat bridges 608 and the cells 602.

Figure 7:
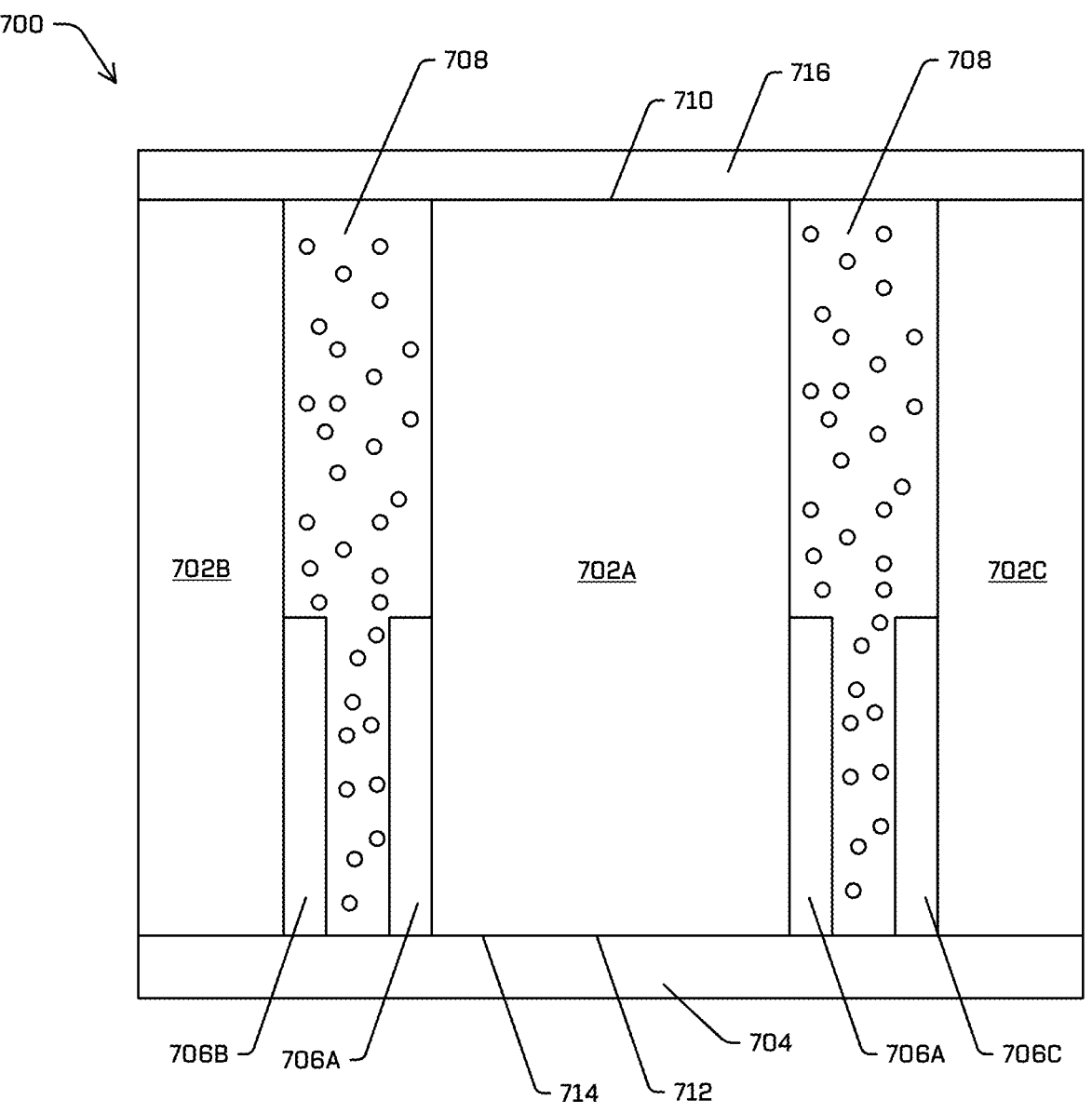
FIG. 7 is a section view of a battery pack of battery cells with liquid for thermal equalization, according to at least one example.

FIG. 7 is a detail view 700 of a battery pack of battery cells 702A, 702B, and 702C (collectively "cells 702") with liquid for thermal equalization, according to at least one example. The cells 702 and other components of the detail view 700 may include elements similar to those described with respect to FIG. 2. For instance, the cells 702, cooling element 704, insulators 706A, 706B, and 706C (collectively "insulators 706"), first end 710, second end 712, and thermally conductive adhesive 714 may correspond to the cells 202, cooling element 204, insulators 206, first end 210, second end 212, and thermally conductive adhesive 214 of FIG. 2. The detail view also shows a bus connection 716 that connects to the first end 710 of the cells 702 to provide an electrical connection for the battery pack. In the illustration of FIG. 7, the cells 702 may be enclosed within a compartment that is waterproof and containing a liquid 708 in contact with the cells 702.

In the example of FIG. 7, the heat bridges may be formed of other materials than shown and described above, such as fluids including liquids. In some instances, the battery pack may have a liquid 708 stored therein that fills spaces between cells 702 and therefore provides a thermal conductivity path (e.g., heat bridge) to the cooling element 704 through the liquid 708. The cells 702 includes insulators 706 at the end proximate to the cooling element 704 to limit heat transfer from the proximate end of the cells 702 to the liquid 708 because heat transfer at the proximate end is primarily through contact between the cells 702 and the cooling element 704. Therefore, the liquid 708 may act as a heat bridge similar to the heat bridges of FIGS. 2-6 to provide a parallel heat transfer path from the portion of the cells 702 distal from the cooling element 704 to the cooling element 704. In some examples, the insulators 706 may include air gap or vacuum insulators, for example by being formed of a thin-walled material (e.g., a low thermal conductivity material such as a plastic) with an air gap or vacuum space to separate the liquid 708 from the second end 712. Because the liquid 708 is used for heat transfer to a cooling element, the liquid 708 need not be circulated by a cooling system or circulation system but may instead rely on natural convection. Due to these factors, the battery including the liquid 708 may be substantially simpler than typical battery systems that use flooded liquid cooling but rely on phase changes or circulation pumps.

Figure 8:
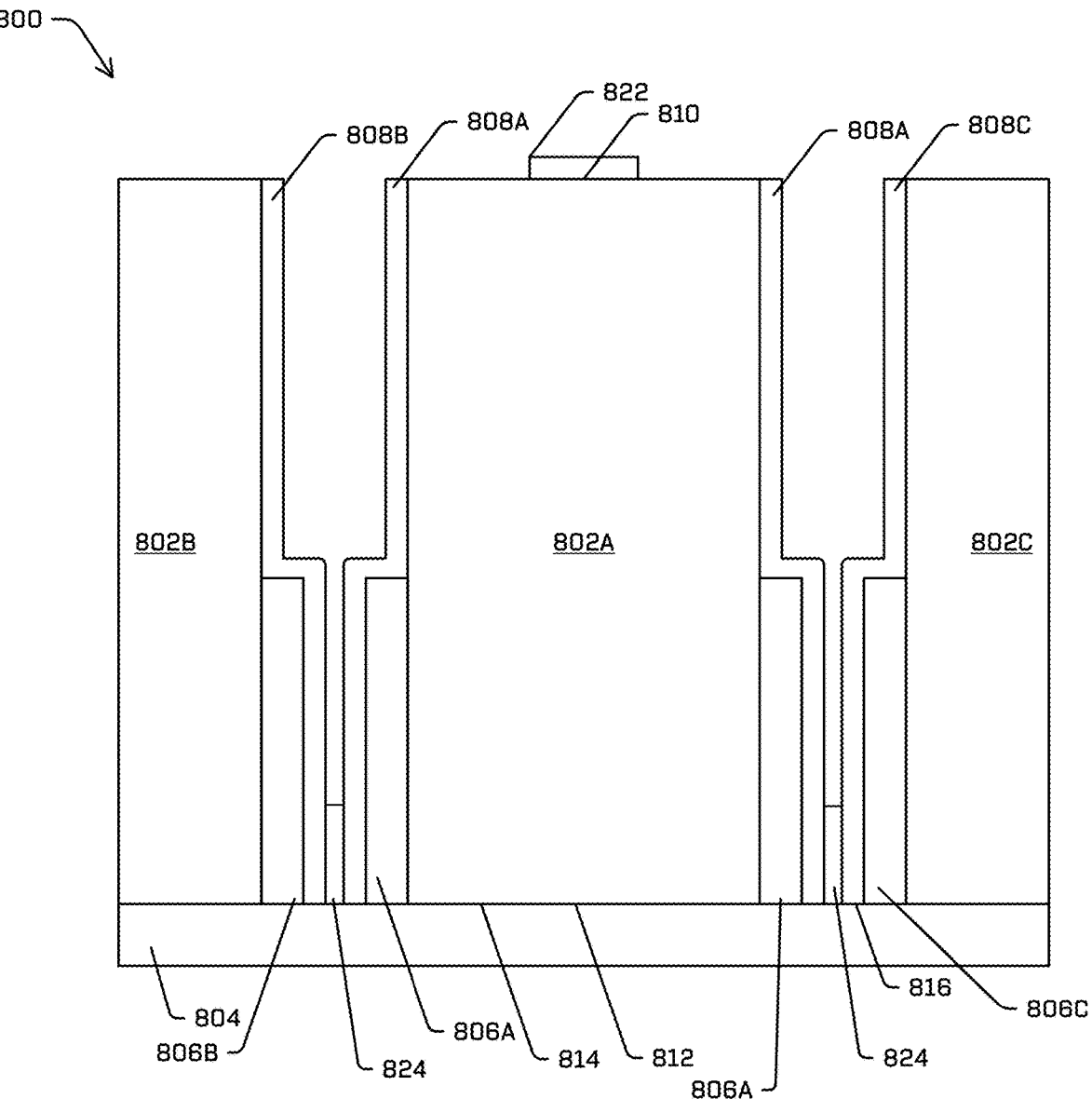
FIG. 8 is a section view of a battery pack of battery cells with thermal equalization devices, according to at least one example.

FIG. 8 is a detail view 800 of a battery pack of battery cells 802A, 802B, 802C (collectively "cells 802") with thermal equalization devices (e.g., heat bridges), according to at least one example. The cells 802 and other components of the detail view 800 may include elements similar to those described with respect to FIG. 2. For instance, the cells 802, cooling element 804, insulators 806A, 806B, and 806C (collectively "insulators 806"), heat bridges 808A, 808B, and 808C (collectively "heat bridges 808"), first end 810, second end 812, thermally conductive adhesive 814, thermally conductive adhesive 816, and electrical connections 822 may correspond to the cells 202, cooling element 204, insulators 206, heat bridges 208, first end 210, second end 212, thermally conductive adhesive 214, thermally conductive adhesive 216, and electrical connections 222 of FIG. 2.

In FIG. 8, a block 824 is positioned adjacent the cooling element 804 and in contact with the heat bridges 808. The block 824 may serve to increase a heat transfer from the heat bridges 808 to the cooling element 804 by being in thermal communication with the heat bridges 808. As such, the block 824 may enable greater heat transfer to the cooling element 804 from the heat bridges 808. Additionally, the block 824 may be used to secure the heat bridges 808 and/or other components to the cooling element 804. In some examples, the block 824 may be formed of an isotropic conductor, such as a metal, including for example copper, aluminum, magnesium, steel, or other such materials.

Figure 9:
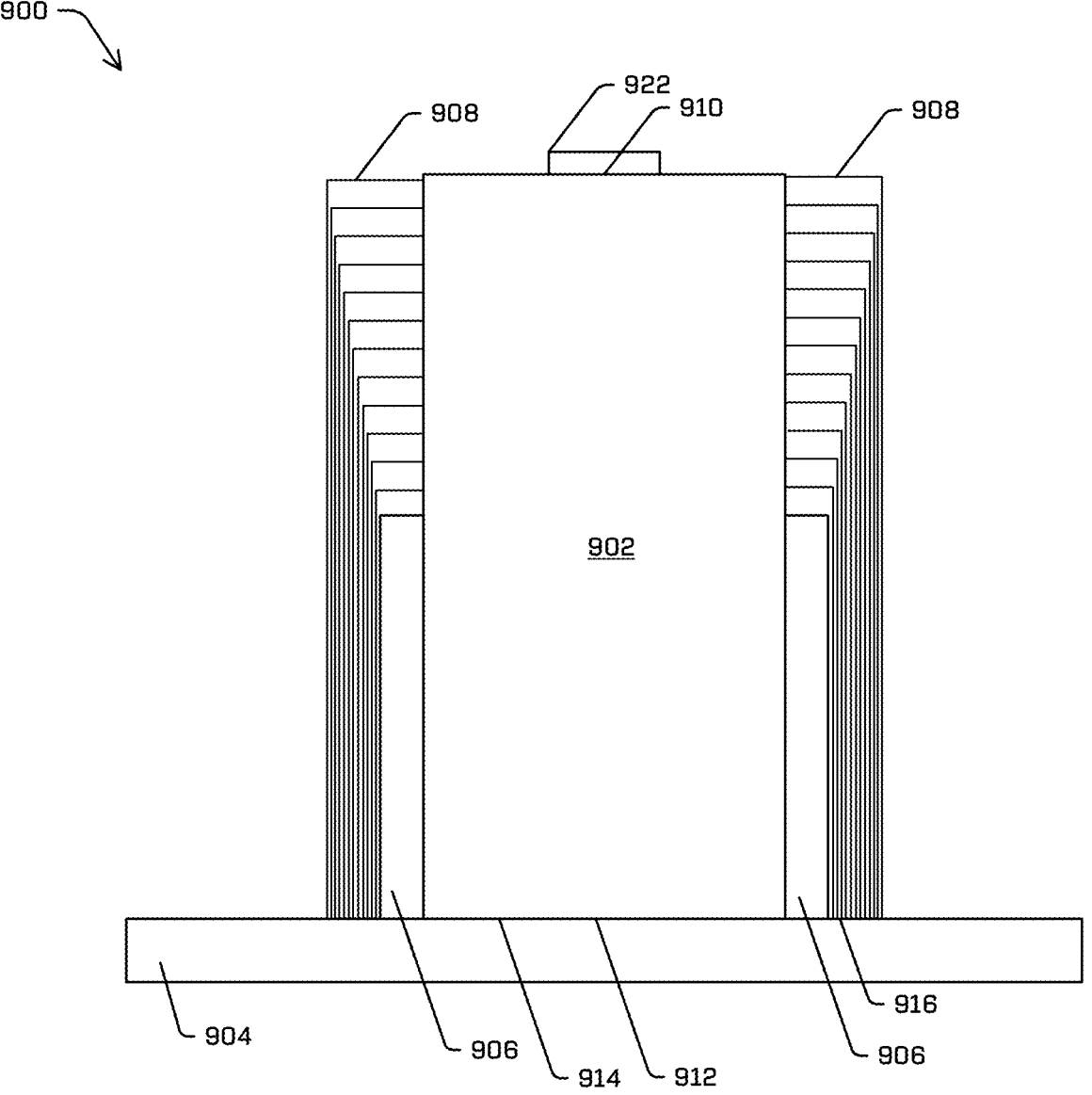
FIG. 9 is a section view of a battery pack of battery cells with thermal equalization devices, according to at least one example.

FIG. 9 is a detail view 900 of a battery pack of battery cells showing an individual cell 902 with a thermal equalization device (e.g., heat bridge), according to at least one example. The cell 902 and other components of the detail view 900 may include elements similar to those described with respect to FIG. 2. For instance, the cell 902, cooling element 904, insulator 906, heat bridges 908, first end 910, second end 912, thermally conductive adhesive 914, thermally conductive adhesive 916, and electrical connections 922 may correspond to the cells 202, cooling element 204, insulators 206, heat bridges 208, first end 210, second end 212, thermally conductive adhesive 214, thermally conductive adhesive 216, and electrical connections 222 of FIG. 2.

In the example shown in FIG. 9, an anisotropic material, such as pyrolytic graphite sheet, is used for the heat bridges 908. The example shown in FIG. 9 is illustrative and not to scale but illustrates layers of pyrolytic graphite sheet (and/or some other anisotropic material) thermally coupled to the cell 902 at the distal end and to the cooling element 904. The layers of pyrolytic graphite sheet have thermal conductivity that may be up to or more than 100 times more conductive along the length of the sheet than across the thickness. Accordingly, the ends of the heat bridges are coupled to the cell 902 such that heat can transfer along the preferred heat transfer path (e.g., along the length of the graphite sheet rather than across the thickness). Similarly, at the cooling element, the ends of the heat bridges provide for the highest thermal conductivity path through the graphite sheet to couple directly to the cooling element 904.

The heat bridges 908 are shown as a series of layers that may stack together to thermally couple the distal end of the cell 902 to the cooling element with parallel heat paths (e.g., through adjacent stacked sheets). In some examples, more layers than illustrated may be used to provide a greater number of heat pathways to the cooling element 904 and thereby increase the temperature normalization of the cell 902.

Figure 10:
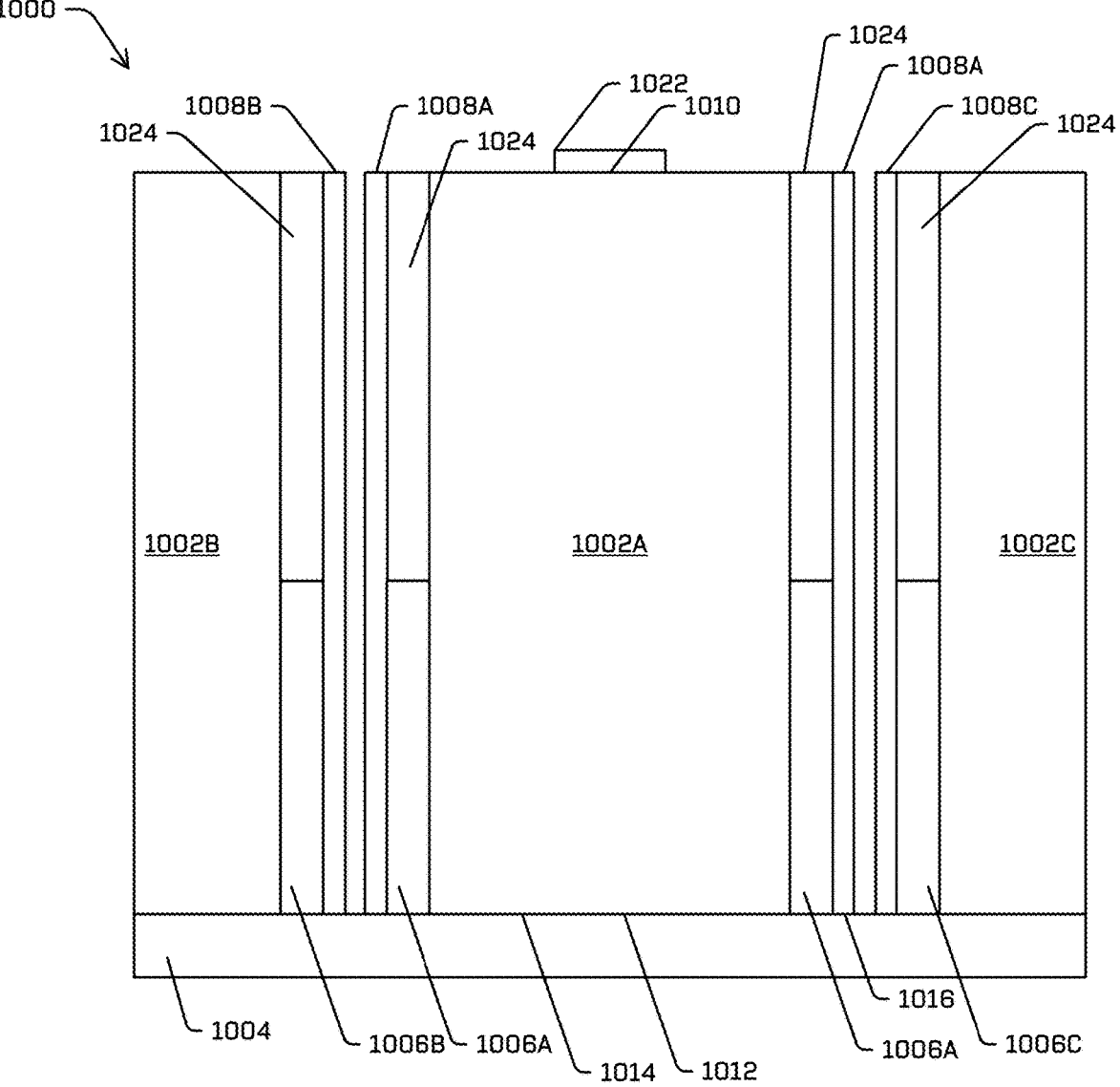
FIG. 10 is a section view of a battery pack of battery cells with thermal equalization devices, according to at least one example.

FIG. 10 detail view 1000 of a battery pack of battery cells 1002A, 1002B, 1002C (collectively "cells 1002") with thermal equalization devices (e.g., heat bridges), according to at least one example. The cells 1002 and other components of the detail view 1000 may include elements similar to those described with respect to FIG. 2. For instance, the cells 1002, cooling element 1004, insulators 1006A, 1006B, and 1006C (collectively "insulators 1006"), heat bridges 1008A, 1008B, and 1008C (collectively "heat bridges 1008"), first end 1010, second end 1012, thermally conductive adhesive 1014, thermally conductive adhesive 1016, and electrical connections 1022 may correspond to the cells 202, cooling element 204, insulators 206, heat bridges 208, first end 210, second end 212, thermally conductive adhesive 214, thermally conductive adhesive 216, and electrical connections 222 of FIG. 2.

In the example of FIG. 10, the heat bridges 1008 are coupled to the distal portions of the cells 1002 through conductive elements 1024. The conductive elements 1024 may have the same thickness and/or shape as the insulators 1006 and may be stacked along the length of the cells 1002 such that an outer diameter of the insulators 1006 and the conductive elements 1024 is a consistent thickness along the height of the cells 1002. This consistent thickness may enable the heat bridges 1008 to be applied to the outside of the conductive elements 1024 and the insulators 1006 and enables the use of materials that may not bend or be able to conform to a more complex geometry. Because the conductive elements 1024 have the same thickness as the insulators 1006, they extend into the same space between cells and do not increase the footprint of the cell when added. The conductive elements 1024 may be formed of a conductor such as a metal, including aluminum, copper, magnesium, steel, or other such material. Additionally, the conductive elements 1024 are formed of a thermally conductive material having a thermal conductivity an order of magnitude or more, greater than the insulators 1006 and therefore provides for temperature normalization across the distal end of the cells 1002 as well as heat transfer to the heat bridges 1008.

In this example, as well as other examples, the cells 1002, with the insulators 1006 and the conductive elements 10214 may have a top view (e.g., looking along the length of the cells 1002) that has a shape resembling a hexagon. In this manner, cells 1002 stack together in a honeycomb fashion to preserve the cell density within the battery pack without increasing the footprint of the battery pack. Such a top view is shown in FIG. 11.

Figure 11:
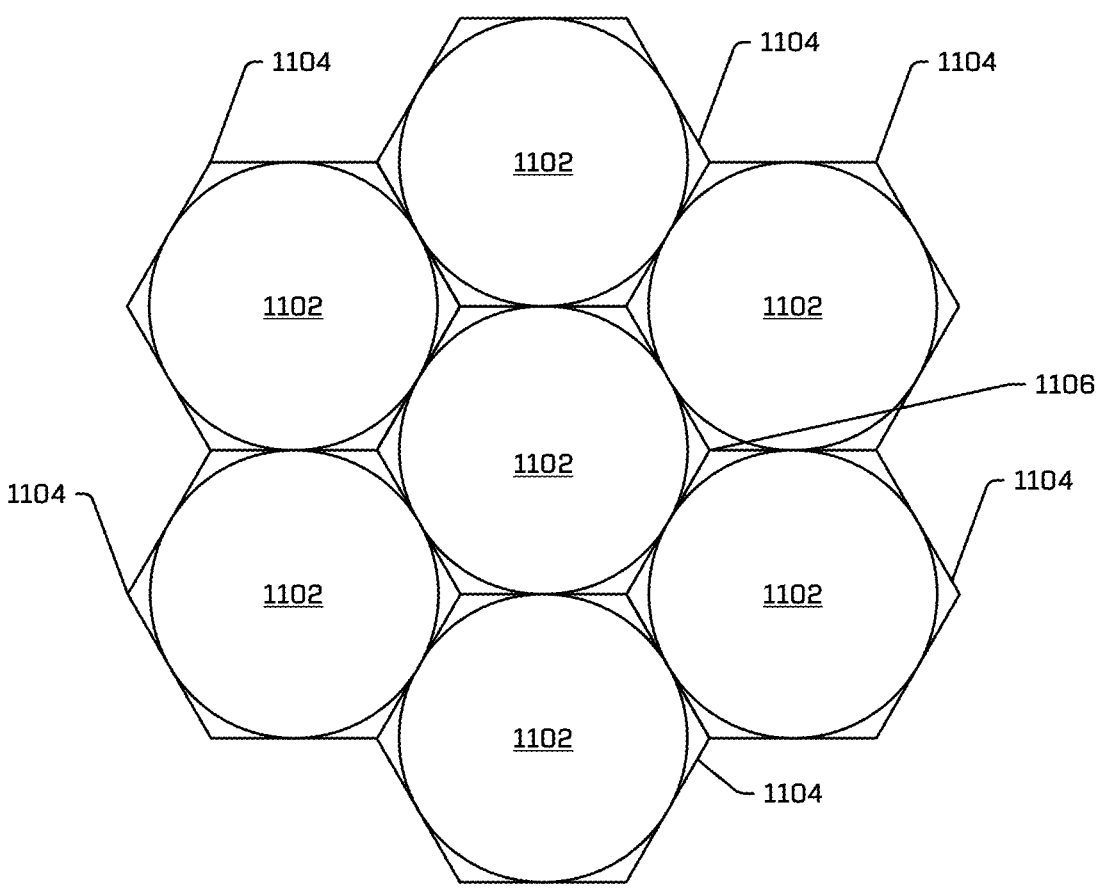
FIG. 11 illustrates a top view of a portion of a battery pack including cells equipped with thermal equalization devices, according to at least one example.

FIG. 11 illustrates a top view of a portion of a battery pack including cells 1102 equipped with thermal equalization devices 1104, according to at least one example. The cells 1102 may be similar and/or identical to the cells described herein, and have a cylindrical shape. When stacked together to form the battery pack, the cells 1102 form a honeycomb arrangement to pack most tightly together, and thereby increase the cell density of the battery pack. The cells 1102 leave spaces 1106 or gaps between the cells where the thermal equalization devices may be arranged, without increasing the footprint of the battery pack.

In the example shown in FIG. 11, the cells 1102 and with the thermal equalization devices 1104 form hexagonal shapes to fill the spaces 1106 without increasing a distance between the cells 1102. In this manner, the thermal equalization devices 1104 may have a variable thickness around the diameter of the cells 1102, with a thicker portion of the insulator and/or heat bridge positioned where the spaces 1106 are the largest and with a thinner portion positioned where the cells 1102 are closest together. In some examples, the thermal equalization devices 1104 may not entirely surround the diameter of the cells 1102 but may be preferentially placed to fill the spaces 1106 without placing any additional material between the cells 1102 where the cells are closest together and/or in contact with one another. In any case, the thermal equalization devices 1104 may be adhered to the exterior of the cells 1102, either to entirely surround the diameter of the cells 1102 or to cover only portions of the outer diameter of the cells 1102.

EXAMPLE CLAUSES

A. A battery pack comprising an array of battery cells, comprising a proximal end and a distal end: a cooling plate coupled to the array at the proximal end: an electric bus coupled to the array at the distal end: a thermal insulator surrounding a battery cell of the array of battery cells at the proximal end; and a thermally conductive heat bridge coupled to both the distal end of the battery cell and the cooling plate, wherein the thermal insulator is positioned between the thermally conductive heat bridge and the battery cell to insulate the proximal end of the battery cell from the thermally conductive heat bridge.

B. The battery pack of example A, further comprising a clamp on an exterior surface of the thermally conductive heat bridge at the distal end and configured to couple the thermally conductive heat bridge to the battery cell.

C. The battery pack of any of examples A-B, wherein the thermal insulator extends less than half a length of the battery cell from the proximal end to the distal end.

D. The battery pack of any of examples A-C, wherein the thermally conductive heat bridge comprises an aniso-tropic material.

E. The battery pack of any of examples A-D, wherein the thermally conductive heat bridge comprises at least one of: pyrolytic graphite: pyrolytic carbon: or a metallic conductor.

F. A battery cell comprising: a body having a first end and a second end and extending a first length from the first end to the second end, wherein the second end of the body is configured to be placed adjacent a cooling plate of a battery pack: an electrical connection at the first end of the body; and an insulator disposed on an outer surface of the body adjacent the second end, the insu-lator extending a second length from the second end towards the first end, the second length less than the first length.

G. The battery cell of example F, wherein the insulator comprises a hollow shell forming a vacuum insulation layer around the body.

H. The battery cell of any of examples F-G, further comprising a thermal conductor coupled to the body adjacent the first end, the thermal conductor extending along an outer surface of the insulator to the second end of the body.

I. The battery cell of any of examples F-H, wherein the thermal conductor contacts the body along a third length from the first end to the insulator.

J. The battery cell of any of examples F-I, wherein the thermal conductor comprises a pyrolytic graphite sheet.

K. The battery cell of any of examples F-J, further comprising a clamp surrounding the thermal conductor at the first end of the body, the clamp configured to secure the thermal conductor to the body.

L. The battery cell of any of examples F-K, wherein the thermal conductor abuts an outer surface of the body at the first end and at least partially surrounds the elec-trical connection.

M. The battery cell of any of examples F-L, further comprising a second insulator positioned at the second end and configured to resist heat flow to the cooling plate from the second end of the battery cell.

N. The battery cell of any of examples F-M, wherein the insulator has a first thickness adjacent the second end of the body and a second thickness at an opposite end of the insulator, the first thickness greater than the second thickness.

O. A battery thermal management system comprising: a cooling element configured to provide cooling to a plurality of energy storage cells of a battery: a body of an individual energy storage cell of the plurality of energy storage cells, the body formed of a thermally conductive material; and an insulator disposed on a first portion of an outer surface of the body, the insulator extending a distance along a length of the body, the distance less than the length of the body.

P. The battery thermal management system of example O, wherein the insulator comprises a hollow shell forming a vacuum insulation layer around the body.

Q. The battery thermal management system of any of examples O-P, further comprising a thermal conductor in thermal communication with a second portion of the outer surface of the body and the cooling element.

R. The battery thermal management system of any of examples O-Q, wherein the thermal conductor com-prises a sheet of thermally conductive material sur-rounding the second portion of the body.

S. The battery thermal management system of any of examples O-R, further comprising a clamp positioned around an outer surface of the thermal conductor adja-cent the second portion of the body and configured to cause the thermal conductor to remain in contact with the second portion of the body.

T. The battery thermal management system of any of examples O-S, wherein the distance is less than half of the length of the body.

While the example clauses described above are described with respect to one particular implementation, it should be understood that, in the context of this document, the content of the example clauses can also be implemented via a method, device, system, and/or another implementation.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples. It is to be under-stood that other examples can be used and that changes or alterations, such as structural changes, can be made. Such examples, changes or alterations are not necessarily depar-tures from the scope with respect to the intended subject matter. While the steps herein can be presented in a certain order, in some cases the ordering can be changed so that certain inputs are provided at different times or in a different order without changing the function of the systems and methods described. The disclosed procedures could also be executed in different orders.

What is claimed is:

1. A battery cell comprising:
a body having a first end and a second end and extending a first length from the first end to the second end, wherein:
the second end of the body is configured to be placed adjacent a cooling plate of a battery pack,
the first length comprises a second length from the second end towards the first end and a third length from the second length toward the first end, the second length and the third length each being less than the first length,
the body comprises a first region and a second region,
the first region is associated with the third length and proximate the first end, and the second region is associated with the second length and proximate the second end;

an electrical connection at the first end of the body; and an insulator disposed on an outer surface of the body adjacent the second end, wherein:

the insulator extends the second length from the second end towards the first end, and the insulator is associated with the second region of the body.

2. The battery cell of claim 1, wherein the insulator comprises a hollow shell forming a vacuum insulation layer around the body.

3. The battery cell of claim 1, further comprising a thermal conductor coupled to the body adjacent the first end, the thermal conductor extending along an outer surface of the insulator to the second end of the body.

4. The battery cell of claim 3, wherein the thermal conductor contacts the body along the third length from first end to the insulator.

5. The battery cell of claim 3, wherein the thermal conductor comprises a pyrolytic graphite sheet.

6. The battery cell of claim 5, further comprising a clamp surrounding the thermal conductor at the first end of the body, the clamp configured to secure the thermal conductor to the body.

7. The battery cell of claim 3, wherein the thermal conductor abuts the outer surface of the body at the first end and at least partially surrounds the electrical connection.

8. The battery cell of claim 1, further comprising a second insulator positioned at the second end and configured to resist heat flow to the cooling plate from the second end of the battery cell.

9. The battery cell of claim 1, wherein the insulator has a first thickness adjacent the second end of the body and a second thickness at an opposite end of the insulator, the first thickness greater than the second thickness.

* * * * *